United States Patent [19]

Chiu et al.

[11] Patent Number: 5,355,146
[45] Date of Patent: Oct. 11, 1994

[54] MULTI-DIRECTIONAL HAND SCANNER AND MOUSE

[75] Inventors: Wing-Lim Chiu, Quarry Bay; Wai-Kwok Chew, Tai Po, both of Hong Kong

[73] Assignee: BMC Micro-Industries Ltd., Singapore, Singapore

[21] Appl. No.: 647,832

[22] Filed: Jan. 30, 1991

Related U.S. Application Data

[63] Continuation-in-part of Ser. No. 489,183, Mar. 5, 1990, abandoned.

[51] Int. Cl.$^5$ ............................................. G09G 3/02
[52] U.S. Cl. ..................................... 345/156; 345/163; 358/473; 382/59
[58] Field of Search ..................... 340/710, 709, 706; 358/473; 382/58, 59, 62; 250/221; 235/472; 345/156, 157, 163, 164, 165, 166, 167

[56] References Cited

U.S. PATENT DOCUMENTS

| | | | |
|---|---|---|---|
| 3,993,865 | 11/1976 | Browne et al. | 178/7.6 |
| 4,260,979 | 4/1981 | Smith | 340/707 |
| 4,581,761 | 4/1986 | Ichinokawa et al. | 382/13 |
| 4,661,810 | 4/1987 | Himelstein et al. | 340/706 |
| 4,707,747 | 11/1987 | Rockwell, III | 358/294 |
| 4,742,559 | 5/1988 | Fujiwara et al. | 382/59 |
| 4,767,923 | 8/1988 | Yuasa | 250/221 |
| 4,797,544 | 1/1989 | Montgomery et al. | 250/221 |
| 4,804,949 | 2/1989 | Faulkerson | 340/710 |
| 4,887,230 | 12/1989 | Noguchi et al. | 340/710 |
| 4,901,163 | 2/1990 | Tsujioka et al. | 382/59 |
| 4,906,843 | 3/1990 | Jones et al. | 250/221 |
| 4,942,621 | 7/1990 | Angwin | 382/59 |
| 4,984,287 | 1/1991 | Massoudi | 382/59 |
| 5,023,603 | 6/1991 | Wakimoto | 340/793 |
| 5,162,781 | 11/1992 | Cambridge | 340/710 |

FOREIGN PATENT DOCUMENTS

| | | |
|---|---|---|
| 0296837A2 | 12/1988 | European Pat. Off. . |
| WO90/059-62A1 | 5/1990 | PCT Int'l Appl. . |
| WO90/059-63A1 | 5/1990 | PCT Int'l Appl. . |

*Primary Examiner*—Ulysses Weldon
*Assistant Examiner*—Xiao M. Wu
*Attorney, Agent, or Firm*—Fitch, Even, Tabin & Flannery

[57] ABSTRACT

A computer system incorporating a combined computer pointing device (mouse) and hand scanner is disclosed. When used as a hand scanner, the device transmits signals representing image data, position information and rotation information to the computer. The computer assembles from the received signals a unified image from possibly non-aligned and overlapping image data and stores the resulting image.

20 Claims, 15 Drawing Sheets

OVERVIEW OF HANDSCANNER CIRCUITS

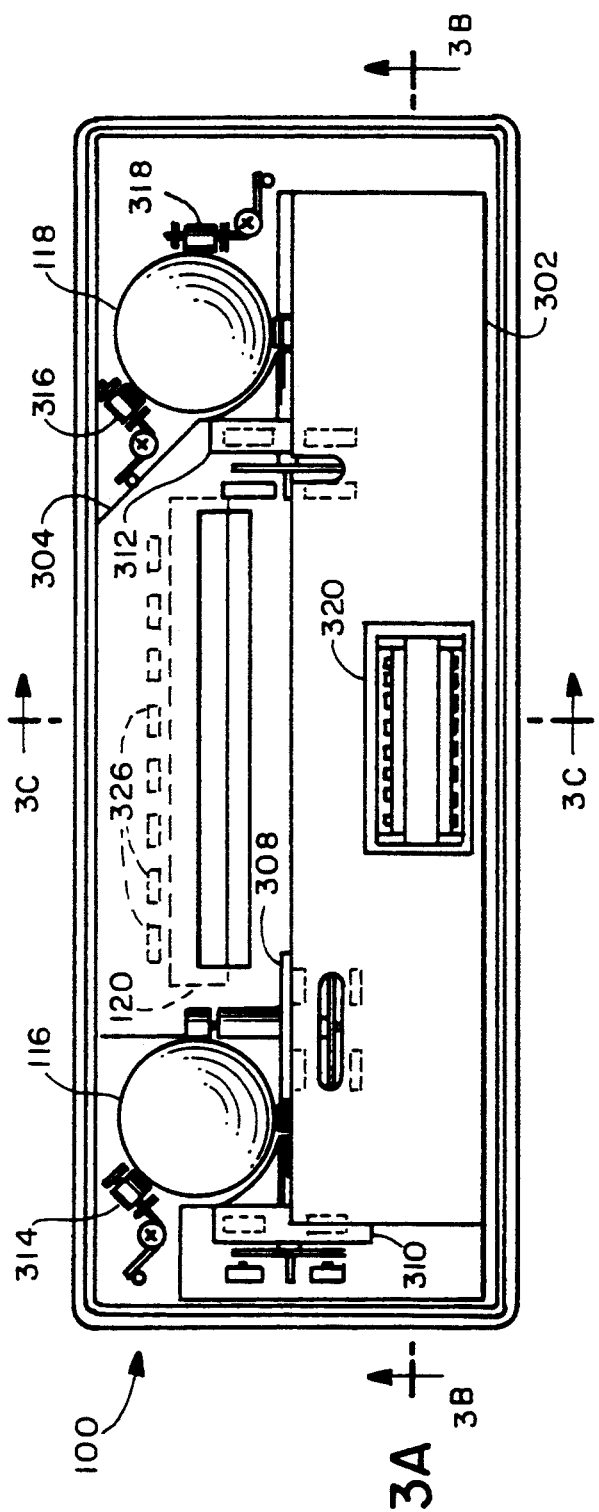
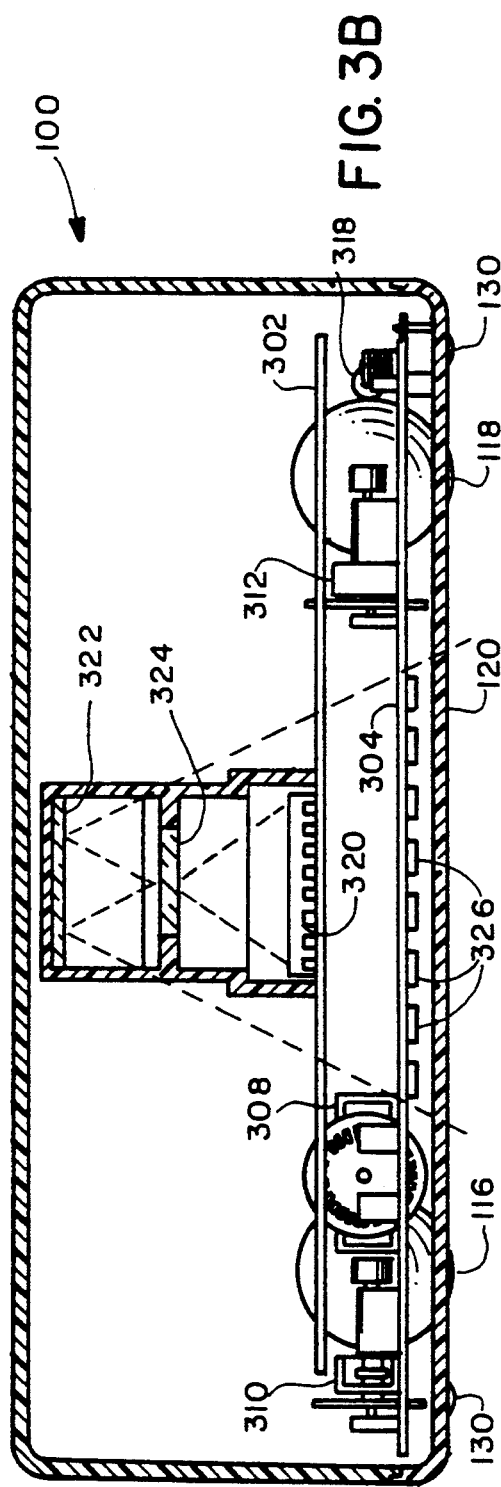

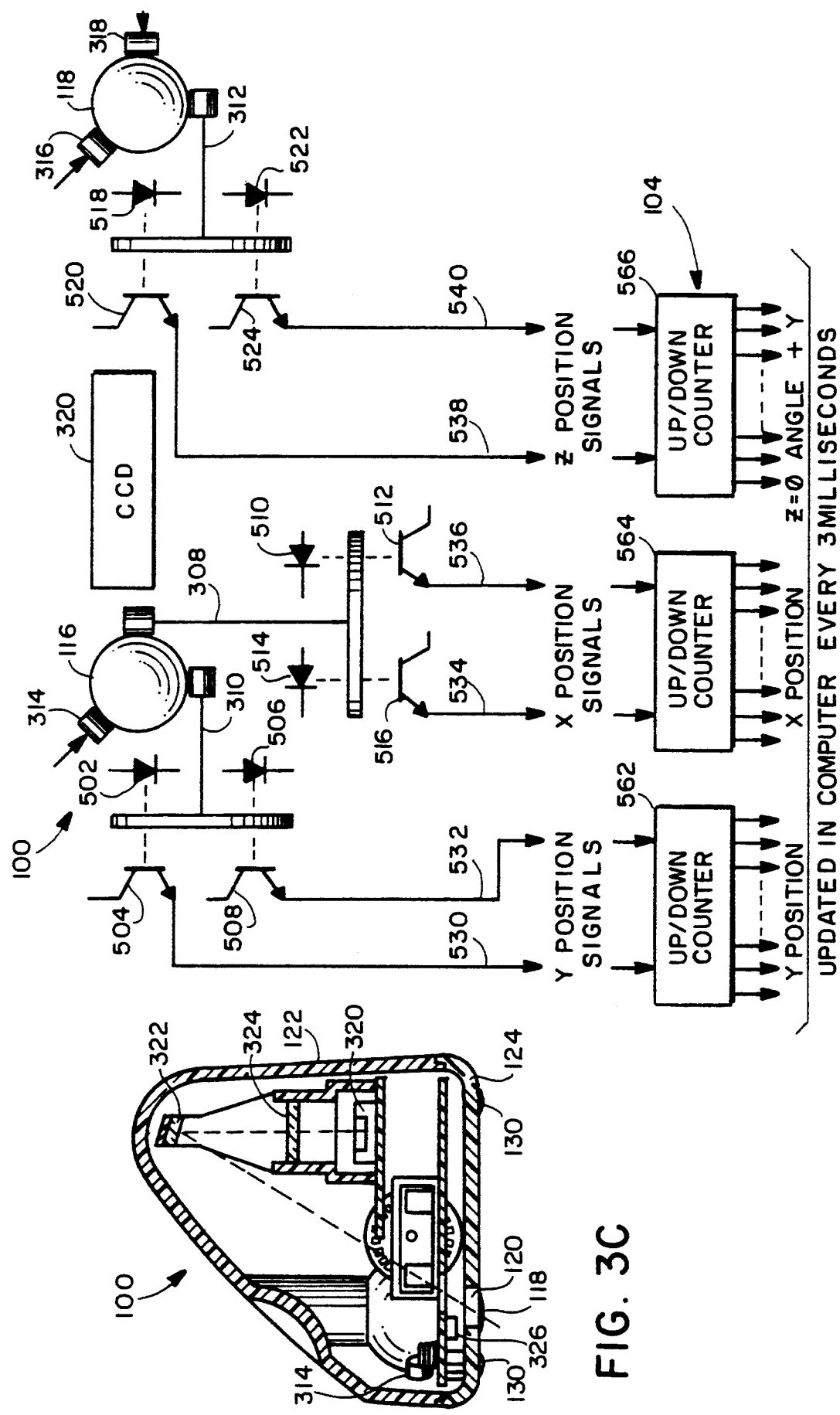

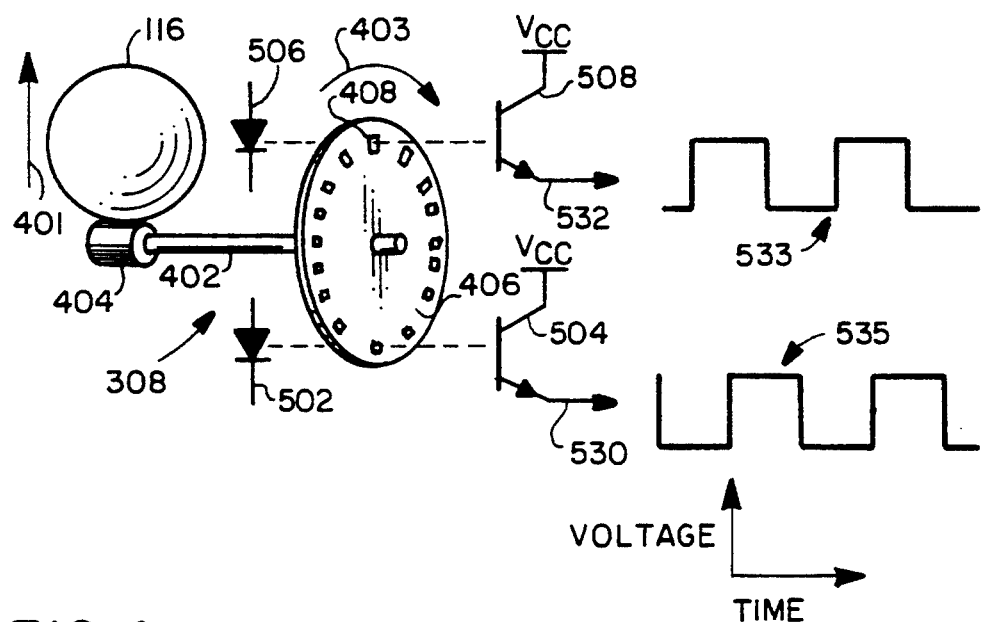
FIG. 4 POSITION TRACKING SIGNAL GENERATOR
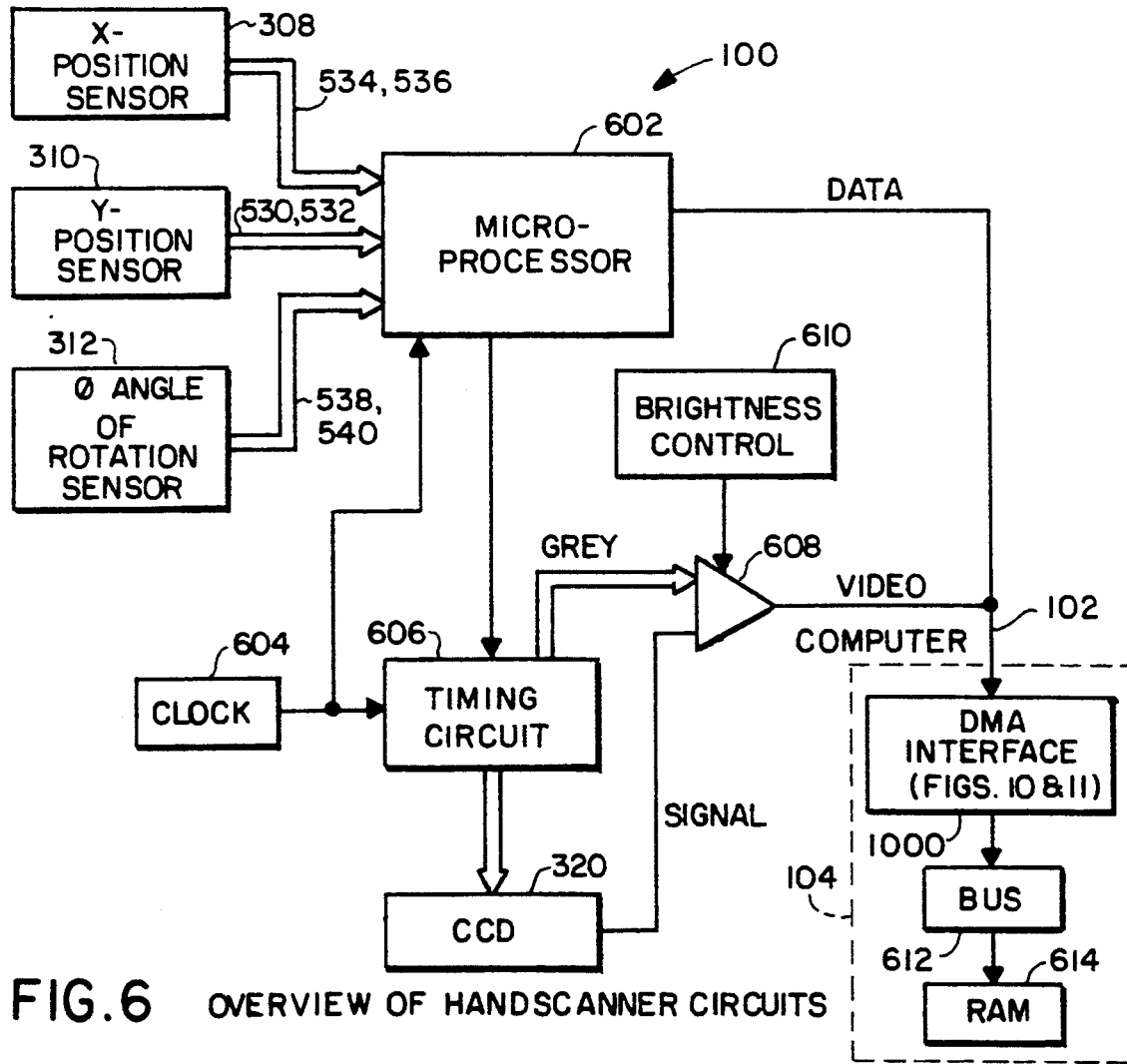
FIG. 6 OVERVIEW OF HANDSCANNER CIRCUITS

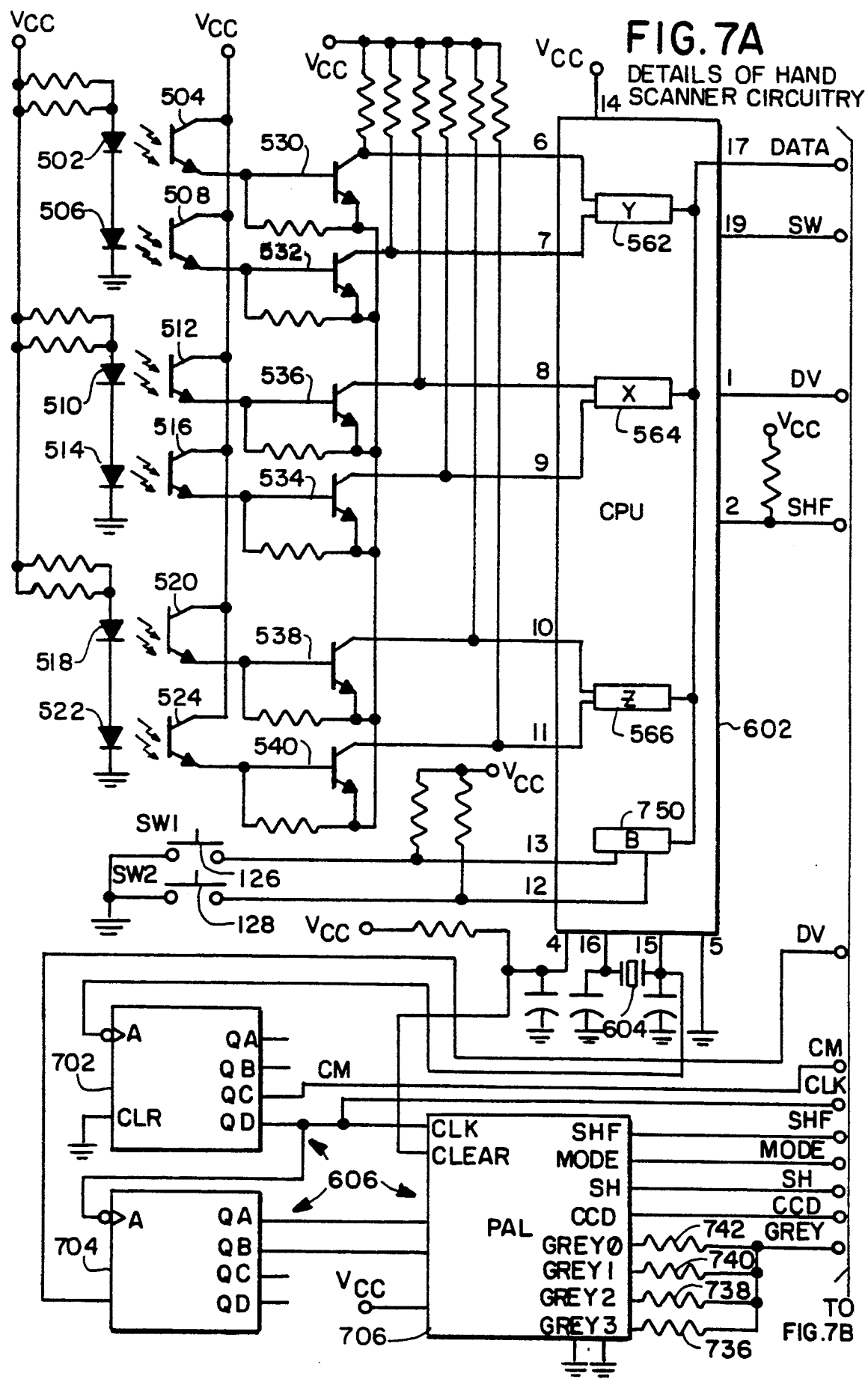

DETAILS OF HAND SCANNER CIRCUITRY

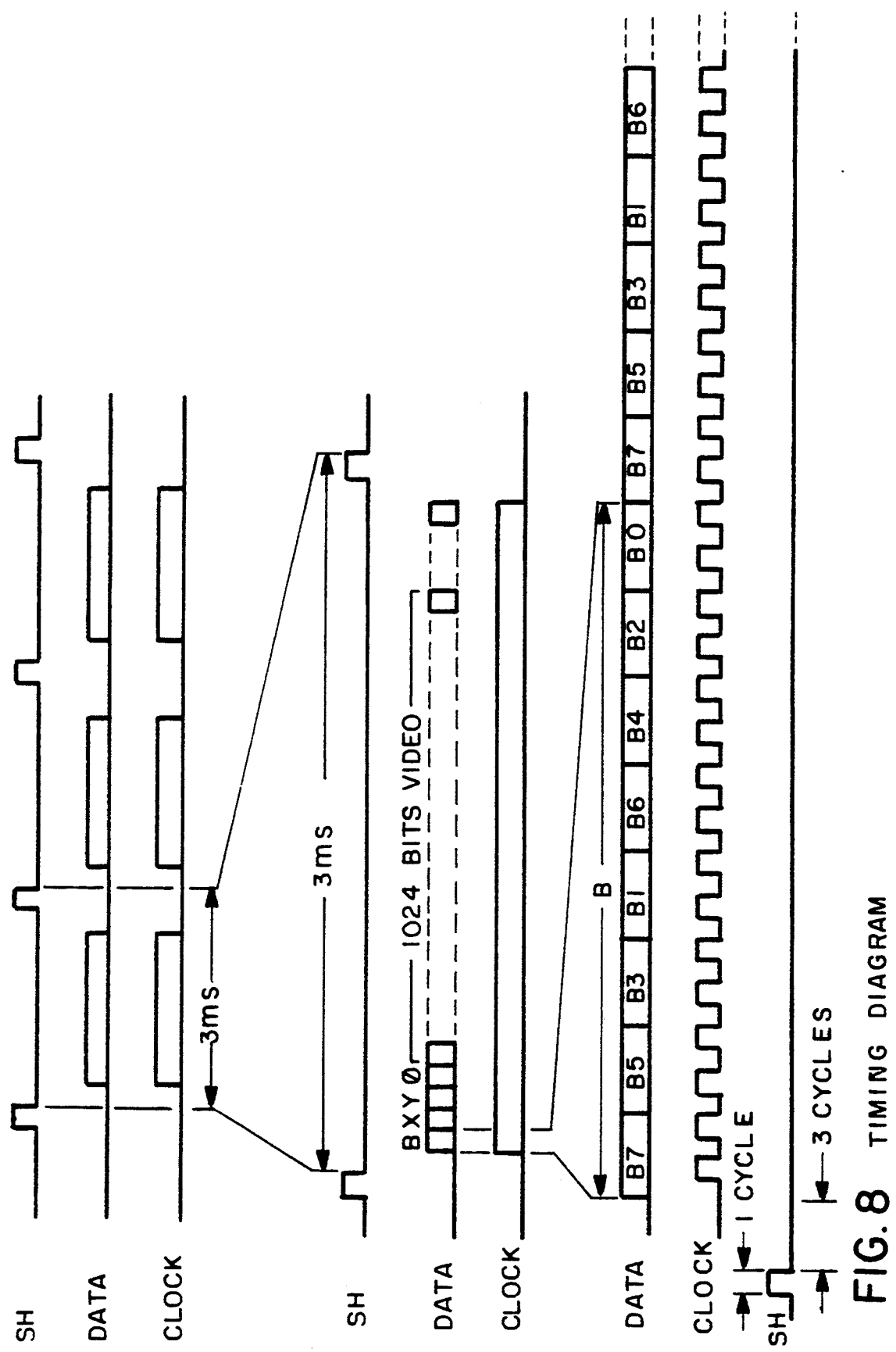

```
0 0 0 0
0 0 0 1
0 0 1 1
0 1 1 1
1 1 1 1
```
FIG. 9  GREY SCALE VALUES
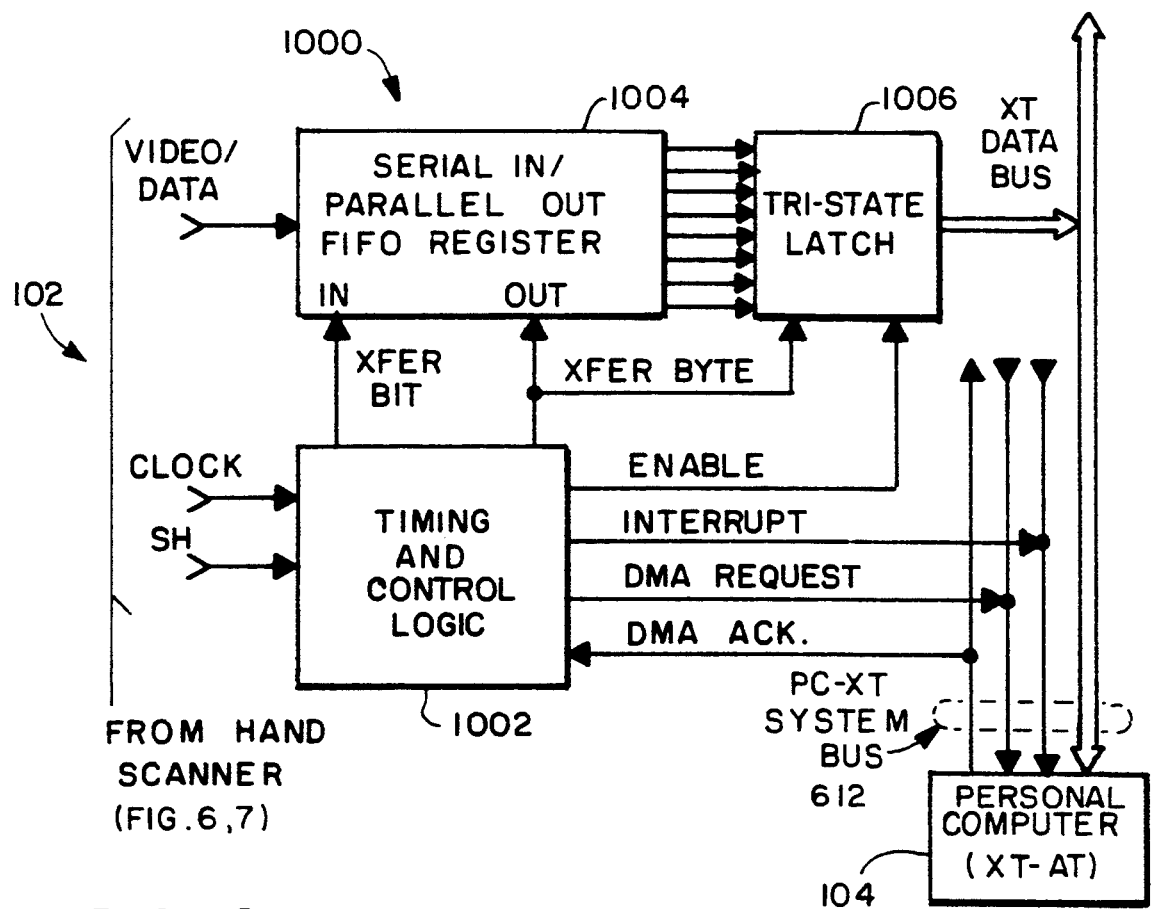
FIG. 10  OVERVIEW OF INTERFACE BOARD

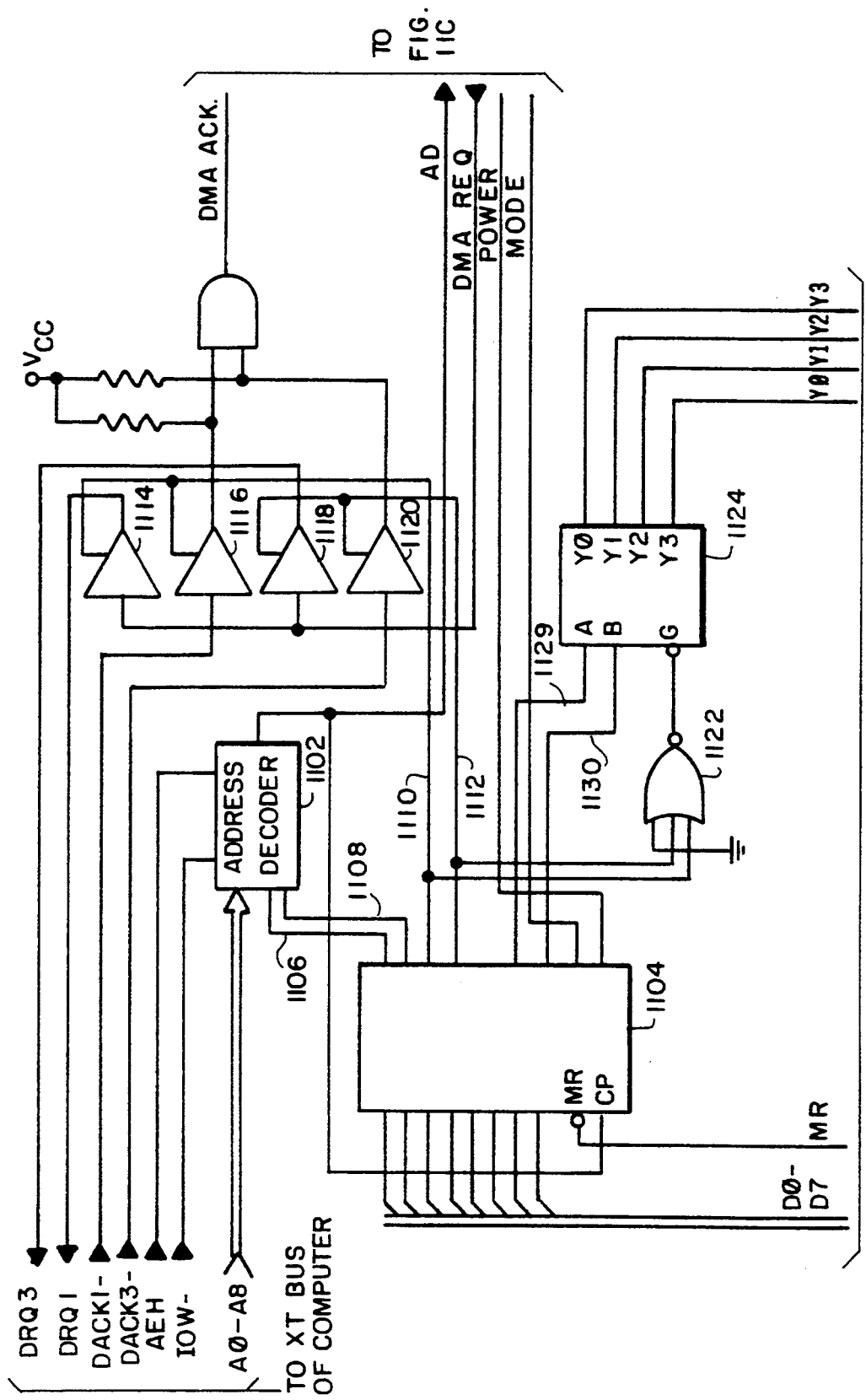
FIG. 11A DETAILS OF INTERFACE BOARD

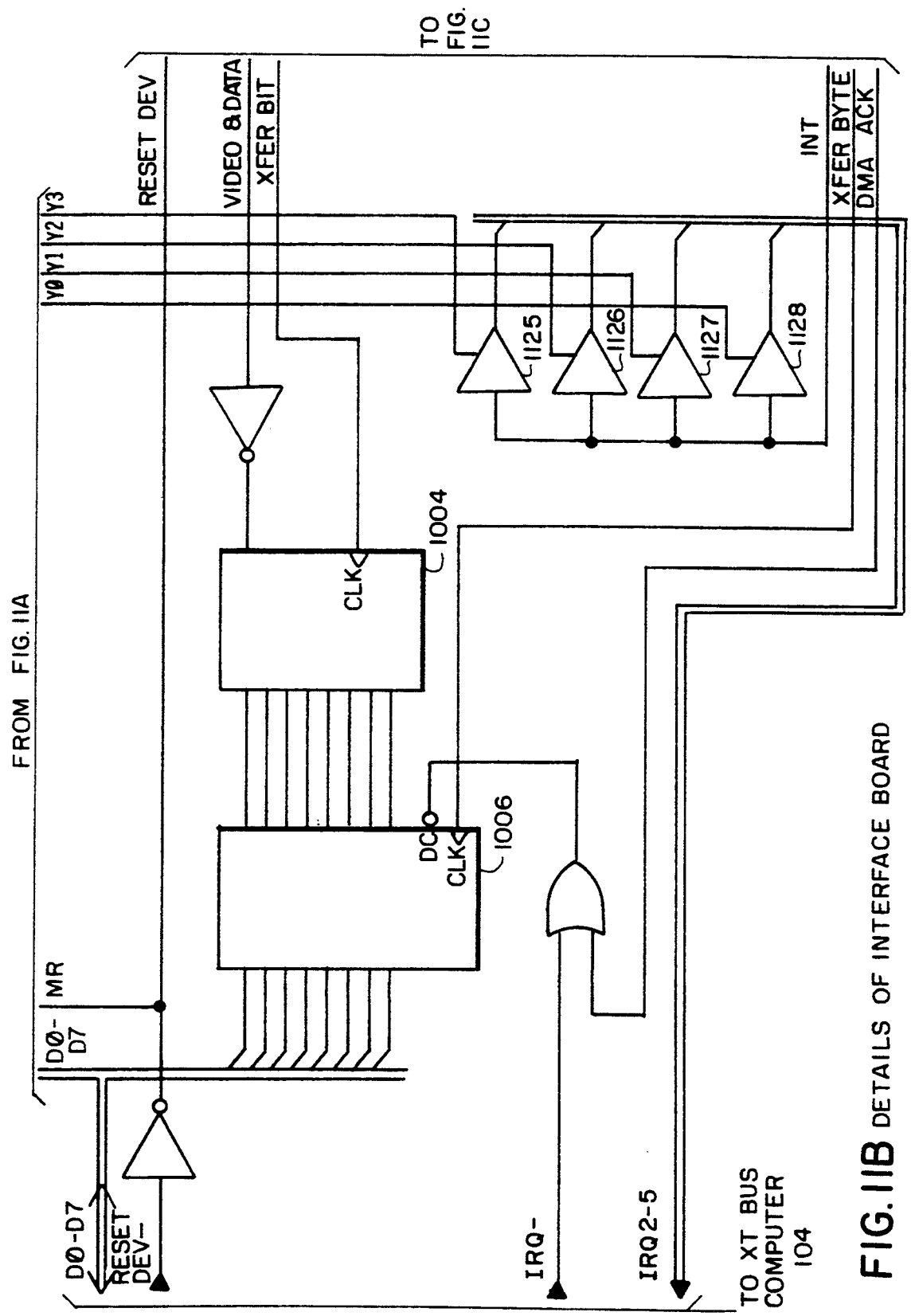
FIG. 11B DETAILS OF INTERFACE BOARD

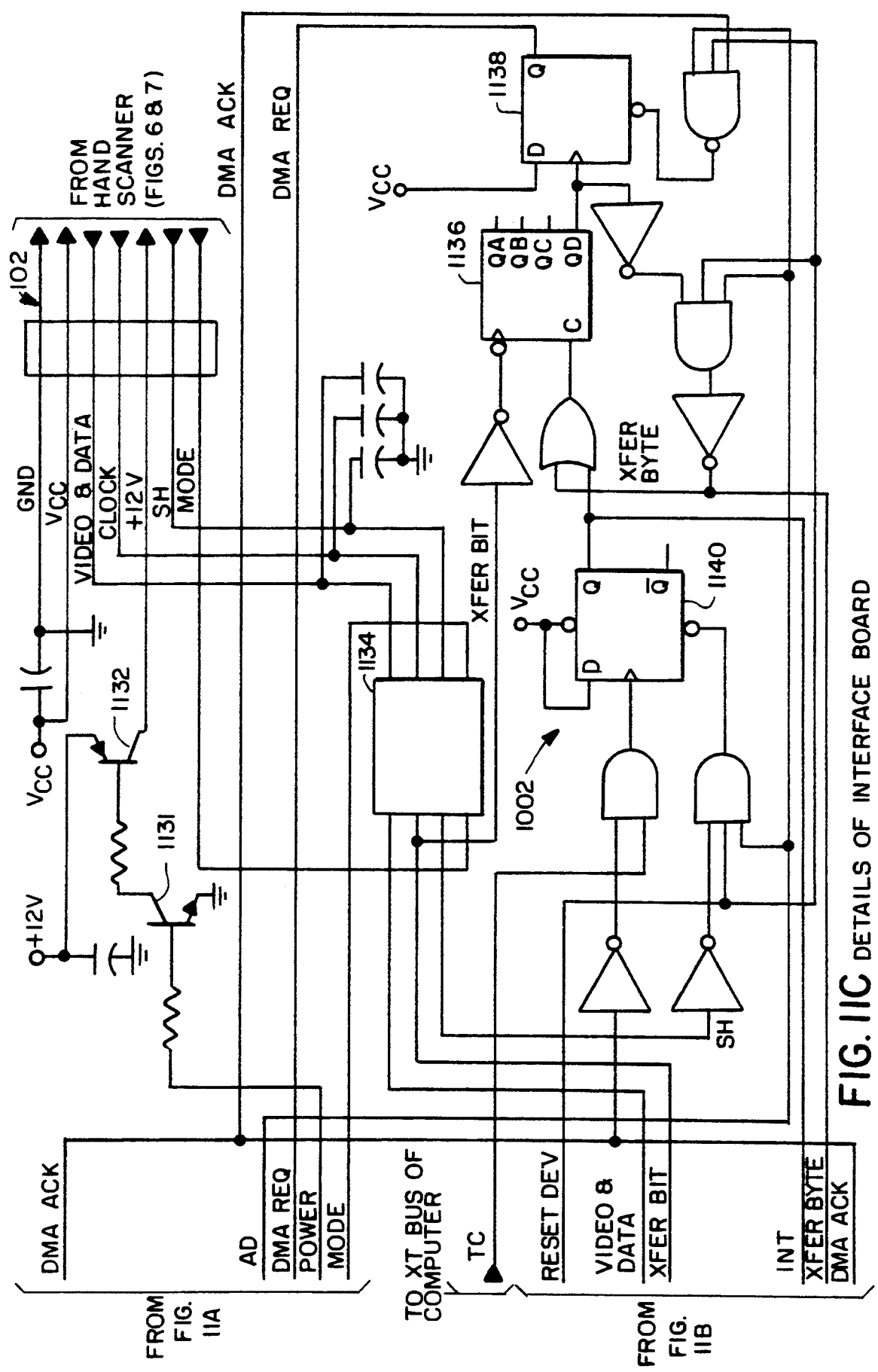
FIG. 11C DETAILS OF INTERFACE BOARD

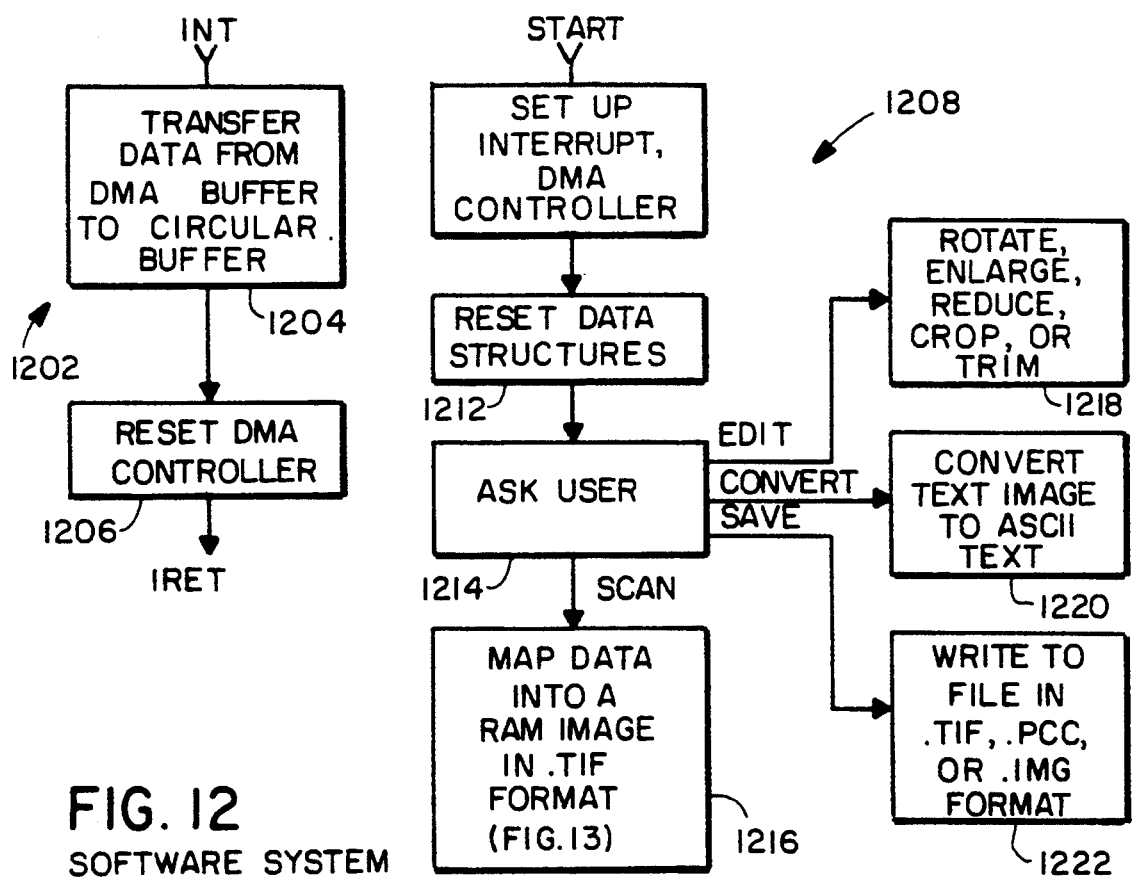
FIG. 12 SOFTWARE SYSTEM
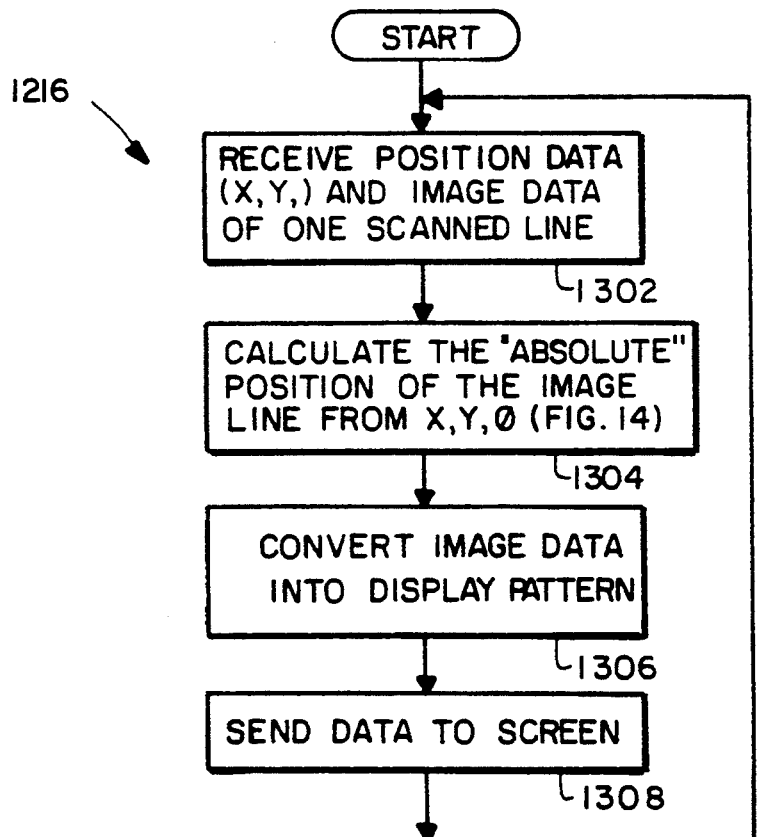
FIG. 13 SCANNER DRIVER PROGRAM

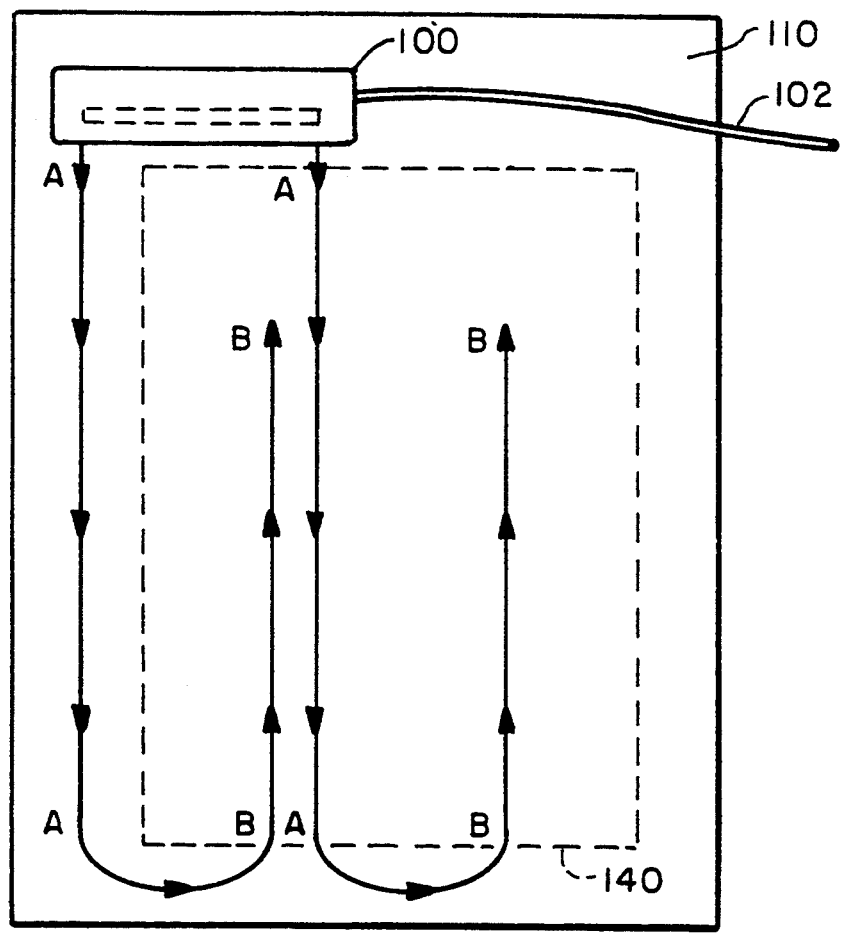
FIG. 15
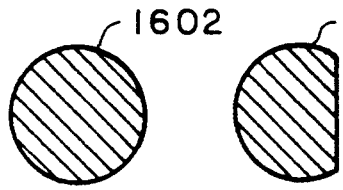
FIG. 16  FIG. 17
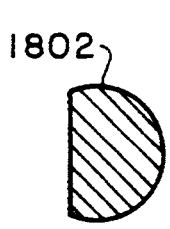 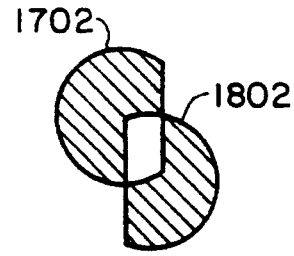
FIG. 18  FIG. 19
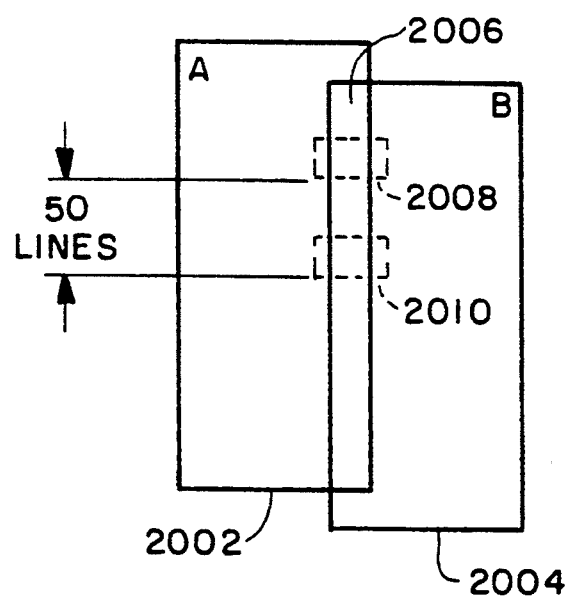
FIG. 20

MULTI-DIRECTIONAL HAND SCANNER AND MOUSE

This application is a continuation-in-part of U.S. application Ser. No. 07/489,183, filed on Mar. 5, 1990, now abandoned.

FIELD OF THE INVENTION

This invention relates to manually-positionable data input devices for computers, and more particularly to mouse input devices and to hand-held document scanning devices.

DESCRIPTION OF THE PRIOR ART

Modern-day computers typically come equipped with a mouse, which is a device that may be manually rolled across the desk top and that reports the changes in its X and Y position on the desk top to the digital computer, thereby enabling the computer to move a corresponding pointing device across its screen in a way which enables the operator of the computer to move a pointer upon the computer's screen by positioning the mouse upon the desk top. Typically, mouse devices include push-buttons which may be actuated by the operator's fingers to facilitate menu selection, text block marking, and the dragging of images across the screen. A number of different mouse designs are known, but the common design utilizes a ball within the mouse positioned to roll across the desk top. Rotational motion sensors positioned 90° apart from one another around the horizontal equator of the ball respectively sense motions of the ball in the X and Y direction and generate pulses which, when transmitted to the digital computer, enable the computer to update counters which contain a continuous record of the X- and Y- position of the mouse and to shift the visible pointer on the computer's screen.

In the field of desk top publishing, it is known to attach a hand-held optical scanner to a digital computer so that images may be captured from documents by sliding the scanner manually across the document. An image of the document is thereby transferred to the screen. Typically, these hand-held scanners contain an extended-length, linear, charged-coupled image sensing element which, together with an appropriate systems of lenses and illumination, captures a one-dimensional, extended image of whatever is positioned underneath the scanner. This image is typically two and a half inches long and one pixel wide. The image typically contains 400 grey scale pixels per linear inch. Typically, such a hand-held scanner includes a wheel which rolls along the surface as the scanner is dragged across the document. A pulse generator associated with this wheel generates pulses indicating the linear motion of the hand-held scanner in a direction perpendicular to the direction of the scan carried out by the charged coupled element. As the scanner is drawn across the document, the pulses generated by rotation of the wheel define when the hand-held scanner has moved a sufficient distance to warrant the capturing of a new scan image in the perpendicular direction. Successive scans are thereby spaced uniformly apart from one another in distance and may be assembled within the random access memory and upon the screen of the computer to form an image of the document which has been scanned. Typically, a single text column, which may contain text and/or images, can be scanned by a single continuous motion of the hand-held scanner in one direction such that the entire column is captured in a single scan.

The prior art arrangements just described suffer from a number of defects. First of all, since mice and hand scanners perform quite different functions, it is typically necessary to equip a single computer with both a mouse and also a hand scanner, thereby cluttering the desk top with two devices and two sets of cables, and thereby requiring the use of two of the computer's limited number of direct memory access channels (or serial ports). An object of the present invention is to replace the separate mouse and hand scanner with a single desk-top device having a single cable and utilizing a single direct memory access channel of the computer.

Hand scanners are defective in a number of respects. First, they must be carefully dragged across a column of a document without the hand scanner being twisted as it is drawn across the column. If any twisting motion is introduced into the hand scanning, the resultant computer image contains distortions. It is shrunk at some points and expanded at other points, reflecting the nonuniform motion of the two ends of the hand scanner.

Additionally, hand scanners can only be pulled across the document in a first direction, typically from top to bottom. They cannot be dragged backwards, for then they would capture an upside down (or inverted) image which would require additional editing on the computer. When a hand scan motion is improperly done, as when the hand scanner is twisted while being drawn across the document, it is impossible with a conventional hand scanner simply to drag the hand scanner back over the document in the opposite direction and thereby correct the defect, for such a motion captures an upside down image. It is therefore necessary to pick up the hand scanner, reposition it manually at the top of the text, and then drag it across the document again. However, the computer then loses track of where the hand scanner is positioned, so the new scan is accepted as a new column of text by the computer and does not automatically overwrite the column containing the scan error.

Finally, if hand scanning captures less than all of the material on a document, with a conventional hand scanner it is impossible to drag the scanner back and forth across the document multiple times and have the scans end up aligned properly within the computer's image of the document. With a conventional hand scanner, each hand scan produces a separate strip of image for the computer, and these separate strips can only be assembled manually by the operator through difficult editing steps.

Accordingly, it is an object of the present invention to achieve a new hand-positionable data input device for a computer that is simpler and faster to use and more convenient than those known to the prior art and that overcomes these defects.

SUMMARY OF THE INVENTION

Briefly summarized, the present invention contemplates the creation of a new type of hand data entry device which combines the functions previously performed by the mouse and by the hand scanner in a highly synergistic way to thereby achieve a much more useful, simple, and flexible scanner and mouse.

The present invention contemplates designing a hand scanner which has, at one end, a traditional mouse position sensing device, such as a mouse ball and a pair of sensors. This device enables the computer to know at all times the precise X and Y coordinate positions of the hand scanner upon the desk top. In addition, a rotational position sensing device is mounted upon the hand scanner. This could take many forms, but in the preferred embodiment of the invention it is a second mouse ball having a single rotational position sensor designed to sense angular movements of the hand scanner. Unlike a conventional mouse, the present invention can identify the rotational position, as well as the X and Y position, of the combined mouse and scanner. Software can thus respond to rotation, as well as to displacement, of the hand data entry device.

The present invention also contemplates new and improved software for the personal computer which is able to respond to the additional information generated by the invention in the form of X and Y position plus angular position of the hand data entry device as well as to the image data captured by scanning. Accordingly, when a hand scanner designed in accordance with the present invention is dragged across a document, and when image data captured in this manner is fed to software designed in accordance with the present invention, the hand scanner may be freely dragged back and forth across the document several times, and its angular position does not need to be critically controlled. The software in the computer, responding to the continuously-monitored X and Y position and angular rotational position of the hand scanner, continuously writes the scanned image data into the appropriate place within a random access memory pixel image of the document. Accordingly, the user can simply drag the hand scanner back and forth across the document in the manner of a painter painting a flat surface and watch as each motion produces a streak of image data painted across the screen of the computer. If any irregularities appear, the hand scanner is simply dragged back across the corresponding area of the document a second time, and the irregularity is automatically erased and replaced with a proper image.

The hand data entry device at other times is fully functional as a mouse pointing device and thereby eliminates the need to have a separate mouse pointing device connected to the same digital computer.

These and other objects and advantages of the invention are apparent in figures and in the detail description which follows. The features of novelty which characterize the invention are pointed out with particularity in the claims annexed to and forming a part of this specification.

BRIEF DESCRIPTION OF THE DRAWINGS

For a further understanding of the invention, reference will be made to the drawings wherein:

FIGS. 3A, 3B, and 3C present detailed mechanical drawings of the internal structure of the device 100;

FIG. 4 illustrates partly mechanically and partly schematically the way in which electrical signals are generated in accordance with rotation of one of the device 100's roller balls in a first direction;

FIG. 5 illustrates partly mechanically and partly schematically the way in which X, Y, and angular coordinates are derived from the two roller balls used in the device 100;

FIG. 6 is an overview block diagram of the internal circuitry of the device 100;

FIGS. 7A and 7B present the circuit details of the device 100;

FIG. 8 presents a timing diagram of various timing signals which are generated by the circuitry shown in FIGS. 7A, and 7B;

FIG. 9 presents the grey scale values that are generated by the device 100's circuitry shown in FIGS. 7A and 7B;

FIG. 10 is an overview block diagram of the interface board 1000 which attaches to a computer and transfers signals from the device 100 into the computer's random access memory;

FIGS. 11A, 11B, and 11C present the circuit details of the interface board shown in FIG. 10;

FIG. 12 is an overview block diagram of the computer's software system, including an interrupt-driven program which receives data from the device 100 and a program which assembles that data into a pixel map in RAM and on the screen;

FIG. 13 is a block diagram of a scanner driver program 1216 (FIG. 12) which actually creates an image of a scanned document in RAM and on the screen.

FIG. 15 illustrates use of the hand data entry device 100 to scan an image wider than the device 100;

FIG. 16 illustrates an exemplary object 1602 that is scanned in two separate scanning motions, as illustrated in FIG. 15;

FIG. 17 illustrates the portion 1702 of the object 1602 that is scanned during the downwards A portion of the scan illustrated in FIGS. 15 and 20;

FIG. 18 illustrates the portion 1802 of the object 1602 that is scanned during the upwards B portion of the scan illustrated in FIGS. 15 and 20;

FIG. 19 illustrates the object portions 1702 and 1802 together to illustrate the error in their relative x and y positions as initially scanned;

FIG. 20 illustrates the overlaps of the scans A and B indicated in FIG. 15 and also illustrates regions 2008 and 2010 spaced 50 scan lines apart that are used in checking the relative x and y misalignments of the scans A and B.

DETAILED DESCRIPTION OF THE PREFERRED EMBODIMENT

Figure 1:
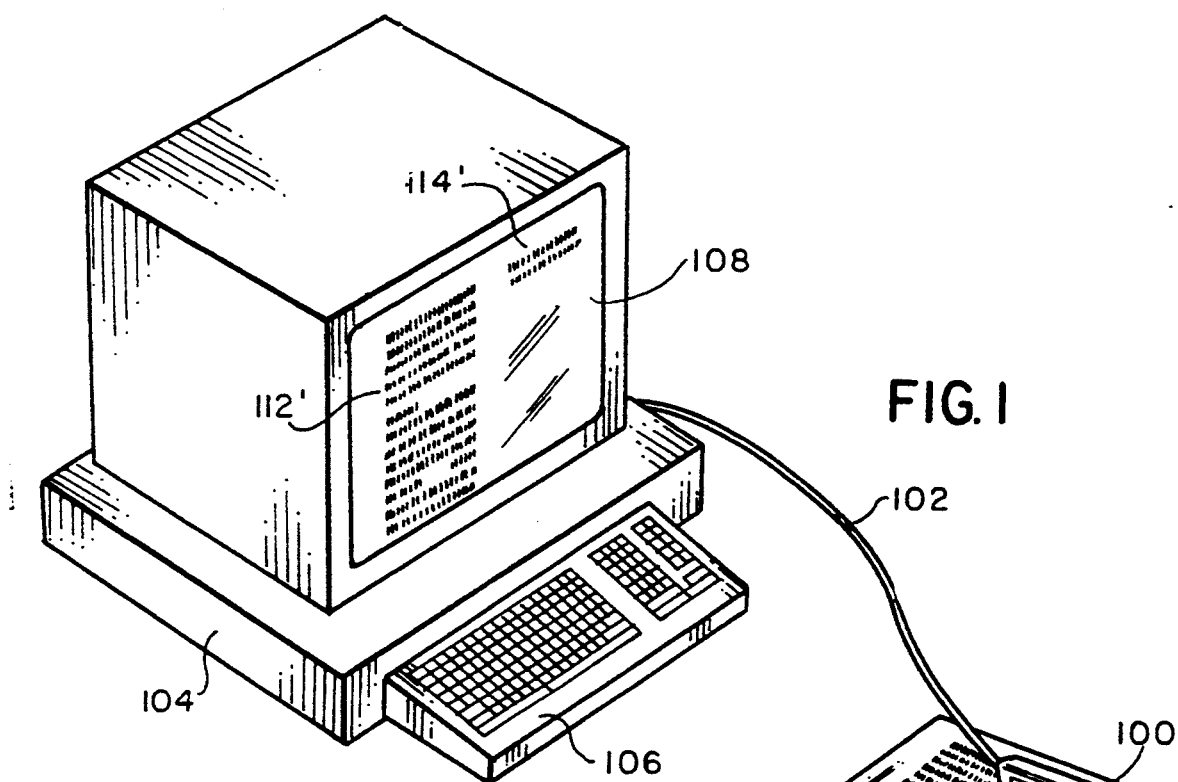
FIG. 1 is a perspective view of a digital computer having attached thereto a hand data entry device 100 that functions both as a mouse pointing device and also as a hand scanner designed in accordance with the present invention.
Figure 2:
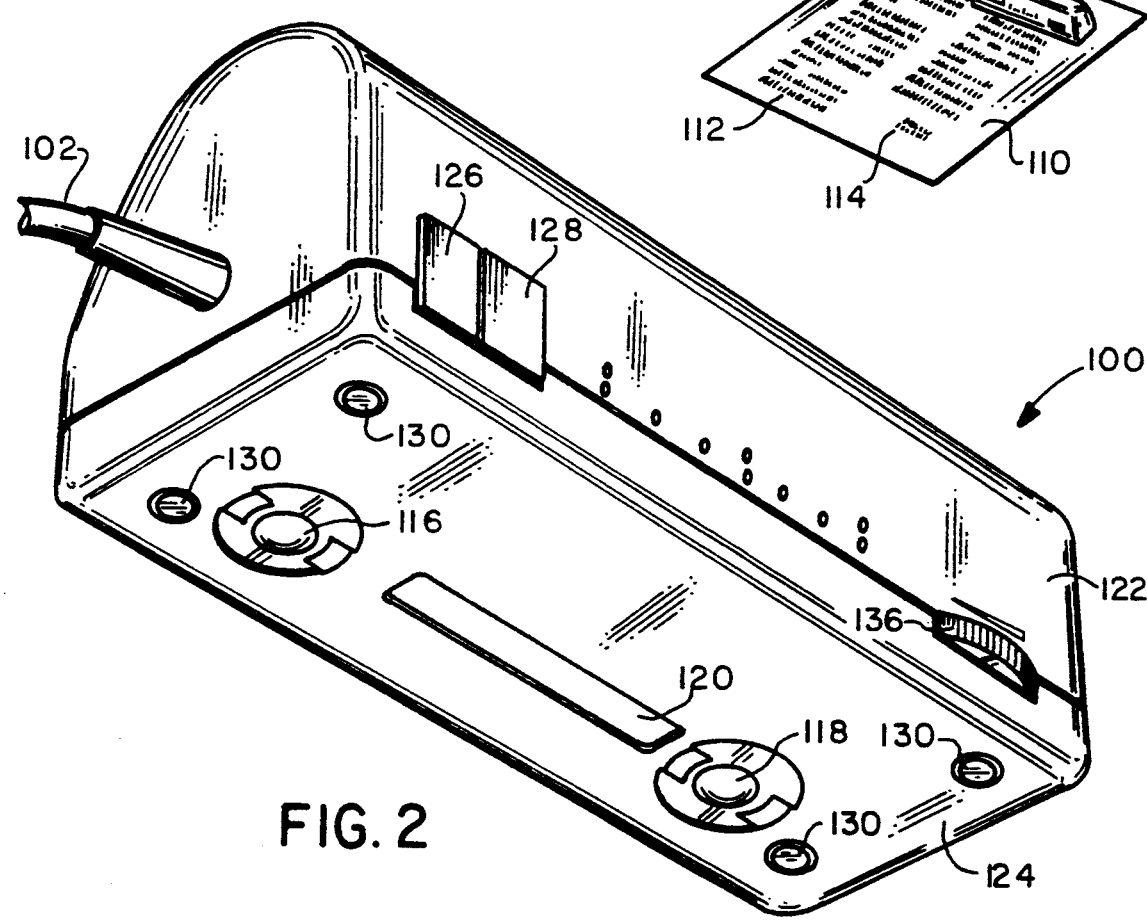
FIG. 2 is a perspective view of the underside of the device 100.

Referring now to the drawings, FIGS. 1 through 3 illustrate the mechanical details and the use of a combined mouse and hand scanner data entry device 100. In FIG. 1, the device 100 is shown connected by a cable 102 to a personal computer 104 having a keyboard 106 and a display 108. The device 100 is positioned on top of a document 110. A user (not shown) has rolled the device 100 up the left-hand column 112 of the document 110, across the top of the document 110, and partway down the right-hand column 114. These motions of the device 100 cause text to appear on the display 108 as shown. Note that the text is right-side up even though the hand scanning proceeded in both directions. Note also that the left and right hand columns 112' and 114' on the display 108 are properly oriented with respect to each other without any special action on the part of the user of the device 100 so long as the device 100 remains positioned flat upon the document 110.

In FIG. 2, the front 122 and bottom 124 of the device 100 are shown in more detail. The bottom 124 of the device 100 has incorporated into itself two mouse roller balls 116 and 118, instead of the single roller ball which is typical of mouse pointers generally. The two balls 116 and 118 are spaced apart from each other by a scanning slit 120 through which the document 110 can be scanned. Slippery feet 130 made of tetrafluoroethylene (TFE) fluorocarbon polymers (such as "Teflon"— TM) permit the device 100 to slide freely across the document 110, when used as a scanner, or across the surface of a desk (not shown) when used as a mouse. Since the device 100 can also be used as a mouse, it includes two mouse push buttons 126 and 128 mounted upon its front surface and positioned for convenient actuation by the thumb of the operator. When so used, the device 100 functions essentially as a mouse. The push buttons 126 and 128 may also be used to control the scanning of text in conjunction with programs running on the computer 104.

When used as a scanner, the device 100 includes an adjustment knob 130 that permits the sensitivity of the scanner logic to be adjusted to match the reflectivity and contrast of the document 110.

The internal mechanical details of the device 100 are shown in FIGS. 3A, 3B, and 3C which respectively show top (with the cover removed), front sectional, and side sectional views of the device 100. The device 100 contains first and second printed circuit boards 302 and 304 mounted one above the other to support the circuitry (FIGS. 6 and 7) and also the mouse ball motion detectors 308, 310, and 312 as well as the mouse ball spring-mounted rollers 314, 316, and 318 which keep the two mouse balls pressed firmly against the motion detectors 308, 310, and 312.

A charge coupled device linear image sensor or CCD 320 (Toshiba part number TCD132D) contains 1024 image sensing elements. An image of the document 110 being scanned enters the device 100 through the opening 120, is reflected from a mirror 322, and is focused by a lens 324 upon the CCD 320. The document 110 is illuminated by illuminating diodes 326.

The general principles of operation of the present invention can best be understood with reference to FIG. 5 which illustrates, from a high level system perspective, how the device 100 functions.

The device 100 is shown comprising the CCD 320 mounted in between the two mouse roller balls 116 and 118—other mechanical details are not shown for simplicity. The mouse ball 116 has positioned about its horizontal equator, mounted 90 degrees apart from each other or perpendicular to each other, the motion sensors 308 and 310, as in a conventional mouse. The second mouse ball 118 is positioned at the opposite end of the CCD 320 from the mouse ball 116. And since its purpose is only to sense rotational motion of the device 100 about a vertical axis through the ball 116, the ball 118 has touching its horizontal equator only the single motion sensor 312 whose axis is parallel to the line connecting the centers of the two mouse balls 116 and 118. In this manner, the motion sensor 312 responds only to motions perpendicular to the line connecting the centers of the two mouse balls 116 and 118 which motions are partly due to rotation about the ball 116 and partly due to translation. But the difference between the output of the motion sensor 312 and the motion sensor 310 is the amount of rotational motion that has occurred.

FIG. 4 explains the way in which the motion sensors function. The typical motion sensor 308 includes a central shaft 402 mounted with its axis horizontal and having a cylindrical wheel 404 mounted at one end of the shaft and touching the horizontal equator of the ball 116. Accordingly, when the ball 116 rolls in the direction of the arrow 401, the ball 116 rotates the cylinder 404 and shaft 402. A disk 406 bearing plural slots 408 about its perimeter is rigidly attached co-axially to the shaft 402 at its other end. When the ball 116 rolls in the direction of the arrow 401, the disk 408 rotates in the direction indicated by the arrow 403. When the ball 116 rolls in the opposite direction, the disk 408 rotates in the opposite direction. Accordingly, movement of the device 100 in the direction of the arrow 461 causes both the ball 116 and the disk 406 to rotate, and movement of the device 100 in the opposite direction causes reverse rotation of the ball 116 and disk 408. Rotation of the device 100 may rotate the ball 116, but such rotations about a vertical axis cannot be imparted to the cylinder 404, so the disk 406 remains stationary. Likewise, motions of the device 100 in a direction perpendicular to the arrow 401 cause the ball 116 to rotate about an axis passing through the cylinder 404 and does not impart any motion to the disk 406. Accordingly, the motions of the disk 406 follow motions of the device 100 parallel to the arrow 401 only. For convenience, this direction (generally perpendicular to the long axis of the device 100) will be called the Y direction.

A pair of light emitting diodes 502 and 506 are mounted on one side of the disk 406 positioned to illuminate, through the slits 406, respective light sensitive transistors 504 and 508. The precise positioning of the diodes 506 and 502 and transistors 504 and 508 with respect to the disk 406 is adjusted so that the signals 530 and 532 generated by the transistors 504 and 508 as the disk 406 rotates fluctuate in time in quadrature relation, such that the fluctuation 533 of the signal 532 occurs 90 degrees out of phase with the fluctuation 535 of the signal 530. Accordingly, the alternate fluctuations of the signals 530 and 532 where the fluctuations of the signal 530 mirror but follow those of the signal 532, as shown, indicate the disk 406 is rotating in the direction of the arrow 403 which corresponds to positive Y direction motion of the device 100. But fluctuation of the signal 530 which mirror but lead those of the signal 532, as is not shown in the figure, indicate rotation of the disk 406 in the opposite direction and minus Y motion of the device 100. The magnitude of any motion is indicated by the number of pulses generated, and the direction by the phase relationship of the two signals 530 and 532.

Referring once again to FIG. 5, each motion detector 308, 310, and 312 has associated with it a pair of diodes 510–514, 502–506, and 518–522 which illuminate respective photo transistors 512–516, 504–508, and 520–524 causing them to generate respective pairs of signals 536–534, 530–532, and 538–540.

The motion detector 310 generates the Y position signals 530 and 532 whose fluctuations indicate motion of the device 100 in the Y direction (perpendicular to its main axis). The motion detector 308 generates the signals 534 and 536 whose fluctuations indicate the motion of the device 100 in the X direction (parallel to its main axis). The motion detector 312 generates the signals 538 and 540 whose fluctuations indicate the combined Y axis motion of the device 100 plus rotational motion of the device 100 about the ball 116. For convenience, this motion is called Z axis motion. Note that these axes do not remain fixed but rotate with respect to the document 110 and the screen image 108 when the device 100 is rotated clockwise and counterclockwise by the user. However, since the user normally tries to keep the device 100 parallel to the document text, it is generally acceptable, for the purposes of this simplified description of the invention, to think of the X and Y position signals as indicating motion of the device 100 parallel to and perpendicular to the lines of text in the document 110 and to think of the Z position signal as indicating the sum of Y displacement plus rotational displacement such that subtracting Y motion from Z motion gives a measure of the angle the device 100 is rotated away from the horizontal.

Holding to this simplified model of the invention for the moment, conceptually the X-, Y-, and Z-position signals are effectively conveyed from the device 100 to three software counters 562, 564, and 566 within the computer 104 which, by counting the incoming signal fluctuations in the direction indicated by the phase relationship between the signals (as explained above), maintain an X- position count, a Y- position count, and a Z- (or phase angle plus Y) count. These can be used to determine the precise X and Y positions and rotational alignment of the device 100 at all times.

The device 100 continuously causes the CCD 320 to scan the document. These scans are also transmitted to the software within the computer 104. As will be explained, the software (shown in FIGS. 12 through 15) creates in RAM a two-dimensional pixel image containing rows and columns of pixel grey-scale values initially set to some fixed value. Some pixel is picked as the arbitrary initial position of the ball 116 within the device 100, and the angle is initially assumed to be zero. As the scans reach the computer, the software writes the scanned pixels into the array of pixels, initially horizontally and to the right from the arbitrary initial position of the ball 116. Then, as the counters 562, 564, and 566 change to indicate motion of the device 100, the starting pixel where the scanned data is written into the array of pixels is shifted to match the fluctuations of the counters 562 and 564, and the angle of the line through the array of pixel data in memory along which the pixel data is written is swung up and down from horizontal to match the fluctuations of the counter 566. The computer thus acts like an artist who views the document 110 through the slit 120 in the bottom of the device and then draws what he or she sees on the screen with a paint brush at a position on the screen that corresponds to the position and rotation of the device 100 with respect to the document 110. But the software paints into the pixel data in RAM memory, and not directly to the screen.

The pixel data in RAM is maintained in the standard TIFF format. Then the pixel data is mapped to the screen's display buffer in the proper format (VGA, EGA, or Hercules) for the display card and monitor being used.

Note again that FIG. 5 is oversimplified. The remaining figures explain the way the preferred embodiment of the invention is actually implemented.

FIG. 6 is an overview block diagram of the device 100 and the computer 104, emphasizing the information flow paths.

The three motion sensors 308, 310, and 312 generate quadrature-related pairs of rectangular wave signals (see FIG. 4) and feed them into a microprocessor 602. In the preferred embodiment, the microprocessor 602 is a General Instrument Microelectronics PIC16C54 EPROM-based, 8-bit, CMOS microcontroller. Under the timing control of a clock 604, the microprocessor 602 records the incremental changes in the X-, Y-, and phase angle (or Z) position counts. At periodic 3 millisecond intervals, the microprocessor 602 sends to the computer 104 over the cable 102 three bytes of data each representing the delta, or incremental, change in the position of one of the three motion sensors. The value sent is zero if there has been no motion, or a positive or negative number indicating the net number of fluctuation of the motion sensor signal if there has been motion.

The clock 604, in cooperation with a timing circuit 606, simultaneously causes the CCD 320 to capture a linear image of the document 110. This analog image is presented as a signal named SIGNAL to an analog comparator 608 where it is compared to an analog reference stair-step signal called GREY which is generated directly by the timing circuit 606. During each 3 millisecond interval, 1024 analog pixel samples are captured and fed out to the comparator 608. Two master clock pulses (CLK in FIGS. 7A, 7B, and 8) occur during the presentation of each of these analog pixel samples, and the GREY signal stair-step up its four steps in synchronism with the master clock, essentially treating every pair of analog pixel samples as a single sample for purposes of generating binary grey scale values (see FIG. 9) that represent digitally the magnitude of the analog pixel samples. Accordingly, during each 3 millisecond interval 256 sets of 4-bit grey scale values, formatted as indicated in FIG. 9, are generated by the comparator 608 and are fed out as a VIDEO signal over the cable 102 to the computer 104 multiplexed together with the DATA signal. A brightness control 610, which connects to the adjustment knob 130 (FIG. 2), enables the user to adjust the D.C. bias of the GREY signal to compensate for the lightness or darkness of the document 110 (FIG. 1).

Note that the CCD resolution is 400 pixels per inch across a 2½ inch linear scan. After digitization into 4-bit grey scale codes (FIG. 9), with four scan values utilized in each A-to-D conversion, the resolution sent to the computer (and available for Mouse position determination) is 100 pixels per inch. When this data is written into a RAM graphics image, the resolution of the data stored in RAM is 100 pixels per inch both horizontally and vertically. The X and Y motion coordinate resolution is 200 dots per inch. The corresponding angular resolution is 15.12 counts per degree. Accordingly, a 360 degree rotation of the device 100 produces 5443.2 counts of angular rotation.

Within the computer 104, a direct memory access (DMA) interface 1000, actually a plug-in card installed into an IBM-PC compatible computer's XT or AT signal bus, received the multiplexed DATA and VIDEO signals, collects the bits into 8-bit bytes, and presents the bytes to the bus 612 for direct transfer into the computer's random-access memory (or RAM) 614 under the control of the computer's DMA controller (not shown) which steals memory cycles from the computer 104's CPU. After having transferred a full set of the incoming data, the DMA interface 1000 generates a hardware interrupt, and then the software system (FIGS. 12 et seq.) takes over managing the information.

Figure 7B:
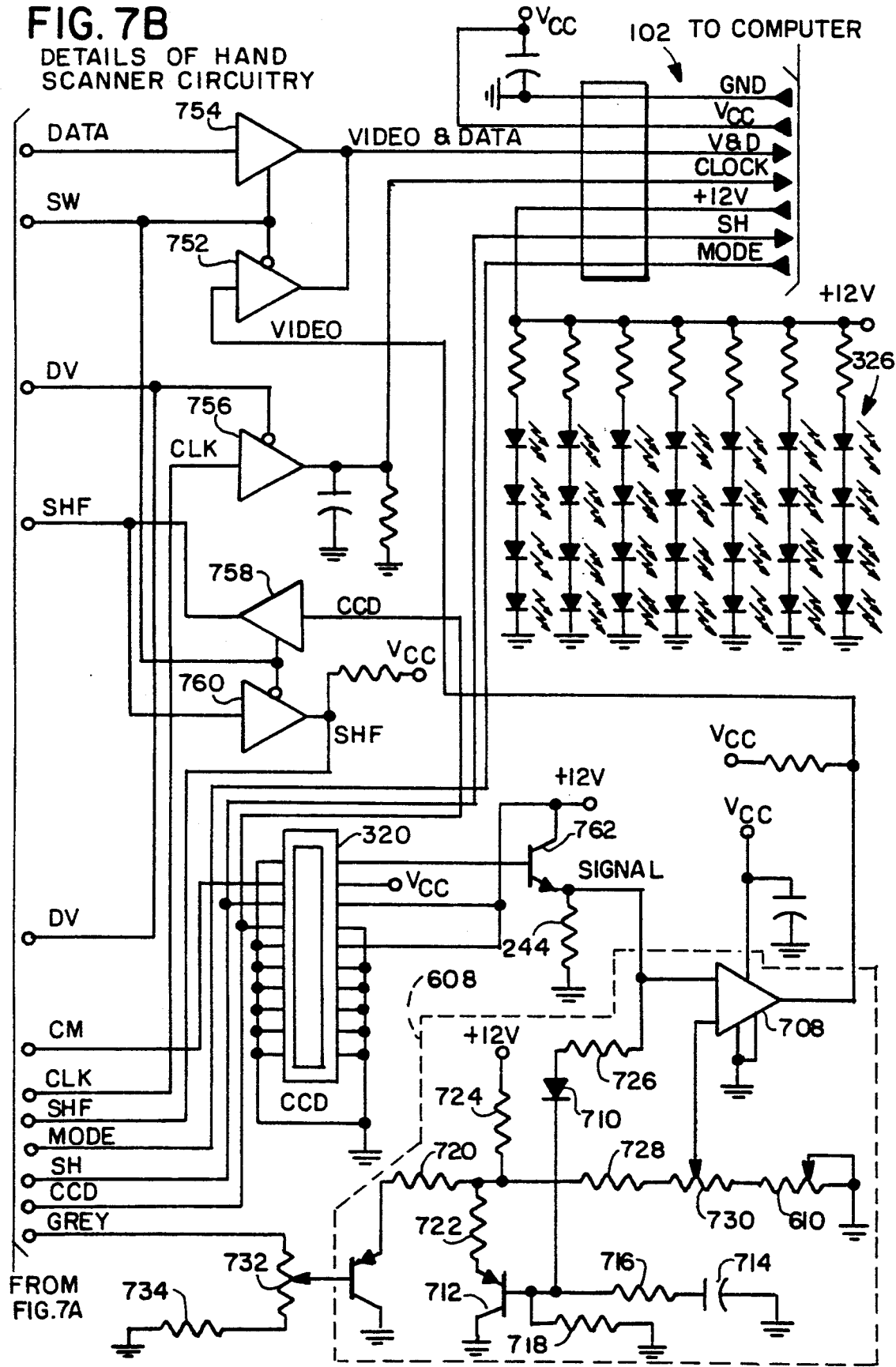

The actual circuit details of the device 100 are set forth in FIGS. 7A and 7B. The timing circuit 606 comprises cascaded counters 702 and 704 which drive a PAL logic unit 706. The logic unit 706 decodes the counter outputs into all the signals essential to the proper operation of the CCD 320 as well as the stair-step GREY signal which flows into the analog comparator 608. The details of the analog comparator 608 are conventional in most respects, with an operational amplifier 708 comparing the amplitude of the GREY signal to that of the CCD output SIGNAL and thereby generating a series of 4-bit digital grey scale values serially on the signal line VIDEO to represent the magnitude of 256 pixel values every 3 milliseconds. To improve the ability of the device to follow gradual fluctuations in the brightness of the document 110 being scanned, the CCD analog output SIGNAL is fed through a peak-detecting diode 710 to the base of a transistor bias amplifier 712 where it is averaged and stored in a gain adjustment capacitor 714 to keep the grey scale voltages a fixed distance away from the peak pixel brightness level.

By way of example, the component values used in the preferred embodiment of the comparator 608 are as follows:

| | |
|---|---|
| resistor 610 | 1000 ohms |
| capacitor 714 | 100 picofarads |
| resistor 716 | 100,000 ohms |
| resistor 718 | 10,000 ohms |
| resistor 720 | 470 ohms |
| resistor 722 | 1000 ohms |
| resistor 724 | 1000 ohms |
| resistor 726 | 150 ohms |
| resistor 728 | 470 ohms |
| resistor 730 | 1000 ohms |
| resistor 732 | 1000 ohms |
| resistor 734 | 1000 ohms |
| resistor 736 | 1000 ohms |
| resistor 738 | 2200 ohms |
| resistor 740 | 3900 ohms |
| resistor 742 | 8200 ohms |
| resistor 744 | 1000 ohms |

The resistors 736, 738, 740, and 742 form a conventional digital-to-analog convertor network which enables the PAL 706, driven by the counters 702 and 704, to generate the four position stair-step wave form. Clearly, the particular wave form generated can be varied to give different degrees of resolution and different biases to the different stair-step levels. In the preferred embodiment, four different levels are generated in growing sequence, and accordingly one of the four digital values shown in in FIG. 9 is generated at the output of the analog comparator 608 in dependence with the level of the VIDEO analog signal. Other types of A to D convertors could be substituted for the one shown here, for example, one that would generate a binary code rather than a grey scale code. And while the preferred embodiment presently sends 4 bits of data for each of 100 pixels per linear inch to the computer, clearly with a scanner resolution of 400 pixels per inch minor adjustments to the system, primarily involving increasing by four the number of data bits generated by the comparator 608 and transmitted to the central computer, could quadruple the resolution of the system to 400 pixels per inch. Other compromises between pixels per inch and the number of shades resolved by the grey scale are also possible at the choice of the system designer.

The microprocessor 602 receives as input signals the pairs of signals 530–532, 534–536, and 538–540 from the X, Y, and Z (or angle plus displacement) motion sensors 308, 310, and 312. At the start of each 3 millisecond timing interval, the microprocessor 602 zeros X, Y, and Z internal up/down software counters 562, 564, and 566. Each fluctuation of the incoming signals is counted on the appropriate one of the counters 562, 564, and 566 as a count up or down, in accordance with the phase relationship between the pairs of signals, as has been fully explained above. Accordingly, at the end of the 3 milliseconds, any change in the position and rotation of the device 100 is fully reflected in the byte-sized count values stored within the counters 562, 564, and 566. The state of the switches 126 and 128 is also sampled at least once every three milliseconds and (after de-bouncing) is stored within a B byte-sized register in bit positions B2 and B3.

The scanner 100 circuitry is controlled by a MODE signal which flows in from the central computer to select between, for example, mouse mode and scanner mode. In mouse mode, the scanner 1000 might emulate a conventional DMA connected mouse pointing device, for example, to be compatible with mouse-compatible software that directly accesses a mouse device through the computer's DMA controller. In mouse mode, data bytes indicating the status of the two primary motion sensors 308 and 310 and switches 126 and 128 is grouped together into bytes which are sent over the DATA and VIDEO & DATA signal lines to the main computer 104, where they are transferred by DMA transfer into buffers serviced by the mouse resident software. Since the design of mouse pointing devices is well-known, mouse mode operation will not be described here further other than to indicate that the preferred embodiment of the present invention functions in a manner fully compatible with conventional DMA mouse systems. The remaining discussion will assume that the device 100 is in scanner mode.

The 3 millisecond timing intervals are measured by the microprocessor 602. At the start of each such interval, the microprocessor 602 is disabling a gate 758 and enabling a gate 760 with a SW (switch) signal. The microprocessor 602 raises a SHF signal at the start of the 3 millisecond timing interval. This SHF signal flows through the gate 760 and the PAL 706 and becomes a SH pulse. The microprocessor then lowers the SHF signal, disabling the gate 760 and enabling the microprocessor to respond to and to count the CCD pulses flowing through the gate 758. Using these as a timing reference, the microprocessor sends out the contents of the X, Y, and Z counters 562, 564, and 566 and the B register 750.

The beginning of each 3 millisecond timing interval is thus signalled by the SH pulse which flows from the PAL 706 over the cable 102 to the computer 104 (see the timing diagram set forth in FIG. 8). The SH pulse endures for one clock cycle and is followed by delay of three clock cycles. In addition to signalling the start of the transmission of a synchronized data packet to the computer 104, the SH pulse actuates the CCD 320 to capture an image and to prepare to shift the analog image data, in bucket-brigade manner, out in the form of the SIGNAL signal. Meanwhile, a signal DV (data valid) generated by the microprocessor 602 holds the counter 704 in its clear state and prevents the clock pulses CLK from flowing to the computer 104 over the CLOCK clock signal line for four complete clock cycles, as is illustrated in FIG. 8.

The DV (data valid) signal then goes high, enabling CLK signal pulses to flow out over the CLOCK signal line to the computer 104. The signal SW (switch) disables (or tri-states) a data gate 752 and enables a data gate 754 to pass a DATA signal to the cable 102's VIDEO & DATA signal line. The CLOCK signal pulses thus clock data bits from the microprocessor 602's DATA output line to the computer 104. In particular, the microprocessor 602 feeds the contents of the B register 750 and the X, Y, and Z counters 562, 564 and 566 out serially onto the VIDEO & DATA signal line, synchronized by the incoming CCD signal (which flows through the gate 758 to the SHF input of the microprocessor 602), with the bytes and bits ordered as is illustrated in FIG. 8, and with a full two cycles of the clock signal CLOCK occurring during the presentation of each data bit so that, in effect, each bit is transmitted twice.

The SW signal next switches its state, disabling the DATA signal gate 754 and enabling the VIDEO signal gate 752, and simultaneously disabling the gate 758 through which the CCD pulses flow and enabling the gate 760 to pass the next SHF pulse at the beginning of the next 3 millisecond interval.

The CCD signal generated by the PAL 706 now causes the pixel analog brightness values to begin appearing as the SIGNAL signal. The comparator 608 compares these analog signal values to the GREY signal staircase wave form and generates, in the VIDEO signal, 256 4-bit pixel brightness grey scale samples during most of the remainder of the 3 millisecond timing interval. As each of the 1028 analog pixels is presented in the SIGNAL signal, one of the four possible grey scale values is generated by the PAL 706. The comparator 608 compares the pixel brightness value to the grey scale value and presents a "1" or a "0" to the VIDEO line in accordance with the result of the comparison for the duration of a single cycle of the clock signal CLK. The three following analog pixel values are compared respectively to the three remaining grey scale values in increasing sequence, thereby utilizing four of the 1024 analog pixels to generate a single 4-bit grey scale value. This process is repeated 256 times, giving rise to 100 4-bit pixel brightness values per linear inch of the scanned document.

Eventually, the DV signal then terminates the CLOCK signal, and the transmission is completed until the start of the next 3 millisecond time interval is signalled by the next SHF pulse from the microcomputer 602. The entire cycle then begins anew.

The remaining signal lines in the cable 102 include 5 and 12 volt power supply leads plus a ground lead which can also be used as a shield. The light emitting diodes 326 that illuminate the document are connected to the 12 volt supply which can be switched off at the computer end when the scanner is not in use. The CCD 320, which also draws 12 volt power, is also switched off along with its output amplifier 762 when the 12 volt power is terminated.

The DMA interface 1000 is shown in overview in FIG. 10, and its details are set forth in FIGS. 11A, 11B, and 11C. Referring first to FIG. 10, the CLOCK and SH signals from the device 100 flow into a timing and control logic 1002. The logic 1002 then generates XFER BIT and XFER BYTE data strobe timing signals. The XFER BIT signal causes bits presented by the VIDEO & DATA signal line of the cable 102 to be strobed into a serial in, parallel out, FIFO register 1004. When a complete byte of information is present within the register 1004, the XFER BYTE signal causes the byte to be transferred into a tri-state latch 1006 that connects to the computer 104's data bus. At this time, the latch 1006 is in its "tri-state" condition and is not presenting data to the system bus 612. The timing and control logic 1002 next generates a DMA REQUEST signal which it applies to one of the DMA channel request lines of the personal computer (DMA0 or DMA1). When the computer 104's CPU is halted and its DMA controller is ready to transfer the byte of data into RAM 614, the DMA ACK signal flows back from the system bus and causes the timing and control logic 1002 to generate an ENABLE signal which causes the tri-state latch to present the byte to the XT data bus. Meanwhile, the next serially incoming data byte is being stored in the serial in and parallel out FIFO register 1004. This process continues from the time when the SH signal pulse occurs at least until all the data bytes have been transferred.

The serial in and parallel out FIFO register can be designed to store up a number of bytes before initiating a burst data transfer, or it can transfer the data bytes one at a time as fast as they come in. When an entire scan worth of data bytes have been transferred into the computer 104's RAM memory 614, the timing and control logic 1002 generates an INTERRUPT signal which, when applied to one of the computer 104's interrupt lines (IRQ2, IRQ3, IRQ4, or IRQ5, for example), causes a hardware interrupt which causes the software interrupt driven program 1202 (FIG. 12) to service the newly-entered data in the DMA RAM 614 buffer by either shifting the data into a circular queue or by servicing the DMA controller to place subsequent transfers into a different RAM 614 buffer.

The details of the DMA circuit interface 1000 are shown in FIGS. 11A, 11B, and 11C. An address decoder 1102 enables the computer 104 software to reset the timing and control logic 1002 and also to place a byte of data into a control register 1104. The first two bits in this register 1104 are connected by signal lines 1106 and 1108 to the address decoder 1102 and permit the address of the register 1104 to be altered in the I/O address space of the computer 104. The next two bits, acting over signal lines 1110 or 1112, selects a DMA channel DRQ1 or DRQ3 and a DMA acknowledgment signal DACK1 or DACK3 by enabling one or the other of a pair of gates 1114–1116 or 1118–1120. The signal 1110 or 1112, acting through an OR gate 1122, also enable a decoder 1124 to generate one of four hardware interrupts IRQ2, IRQ3, IRQ4, or IRQ5 by enabling one of the gates 1125, 1126, 1127, or 1128. The interrupt is selected by bits seven and eight of the register 1104 acting over signal lines 1129 and 1130.

Bits five and six control generation of the POWER signal, which causes the transistors 1131 and 1132 to turn the 12 volt power for the device 100 on and off, and the MODE signal, which passes directly through a driver 1134 to the device 100 to switch it between mouse and scanner mode or to perform any other desired function.

The driver 1134 also strengthens and buffers the three incoming signals VIDEO & DATA, CLOCK, and SH. The incoming CLOCK signal becomes the XFER BIT signal which clocks the incoming data bits off the VIDEO & DATA line and into the serial in and parallel out FIFO register 1004.

The XFER BIT signal is counted by a counter 1136. At a count of eight, the counter 1136 sets a D-type latch 1138 which generates the DMA REQ signal that flows through the enabled one of the gates 1114 or 1118 and activates either the DRQ1 or DRQ3 bus signal lines to initiate a DMA data transfer of one byte of data. The counter 1136 output also flows around a circular path and clears the counter 1136. The counter reset signal is the XFER BYTE signal which causes the tri-state latch 1006 to accept a data byte from the serial in and parallel out FIFO register 1004. The returning DACK1 or DACK3 signal passes through one of the gates 1116 or 1120 and becomes the DMA ACK signal which resets the latch 1138 and which also causes the tri-state latch 1006 to present the data byte to the computer 104's data bus lines D0 through D7.

The incoming SH pulse at the start of each 3 millisecond timing interval clears a flip-flop 1140, causing it to generate an INT signal which flows through one of the four gates 1125, 1126, 1127, or 1128 to one of the four hardware interrupt lines IRQ2, IRQ3, IRQ4, or IRQ5. The interrupt driven program 1202 (FIG. 12) then takes over management of the data set. A bus signal TC then resets the flip-flop 1140 to terminate the interrupt.

FIG. 12 is an overview block diagram of the software portions of the invention. A first interrupt-driven program responds to hardware interrupts generated once every three milliseconds by the interface board 1000 by transferring the data from the DMA buffer into some form of circular buffer, or by reprogramming the DMA controller to load the next batch of data into a different RAM buffer, or by taking some other appropriate form of action at 1204. If necessary, it may also reset the DMA controller in preparation for the next DMA data transfer, and then it returns program control to the calling program.

The main program 1208 is a conventional program that is launched by the operating system and that then converts the incoming scanned images into an image in random access memory. This program begins at 1210 by installing the interrupt program 1202 and performing any necessary programming to the DMA controller, if that has not already been done by a background mouse program. The configuration of the interface board may also require some attention, as to turn on the 12 volt supply for the scanner and its illumination diodes. Some of these steps may be postponed until scanning actually begins, of course.

The RAM data structures for image management are then reset 1212 or, if necessary, allocated from the heap or from high memory.

Next, at 1214, the user is asked what function is to be performed next. Generally, the user will wish to map the incoming data from the circular buffer or other structure maintained by the DMA and interrupt systems into a pixel image that is maintained in RAM in .TIF form (step 1216) and, from there, into a screen buffer from which the data is mapped directly by the hardware into the video display. The user may then wish to rotate, enlarge, reduce, crop, or trim the image at 1218. If the information is textual, the user may wish to call upon a character recognition subroutine to convert the text image into ASCII text 1220 for further processing in a word processor or for storage in retrievable form in a full-text searchable data base or simply for storage in maximally compact form. Alternatively, the user may wish to write the image data into a file in .TIF, .PCC, or .IMG format at 1222. All of these image data manipulation steps are conventional, and need not be described here further, excepting only the data mapping step 1216.

The data mapping step 1216 is further explained in FIG. 13. With respect to each and every incoming set of data delivered by the device 100 during each 3 millisecond interval, the data is first received from the interrupt circular buffer or DMA RAM buffer (step 1302)—or it may simply be located for processing in its present locus. Next, the "absolute" position, both positional and angular, of the newly-received scan pixel data is computed with respect to the .TIF image in RAM (step 1304). Then the image pixels are written into RAM at that position. Next, the image data is converted into whatever display format is appropriate (EGA, VGA, Hercules, etc.) (step 1306). And finally, the display data is written to the screen (step 1308). Of these steps, only the position calculation step 1304 requires a further explanation.

Figure 14:
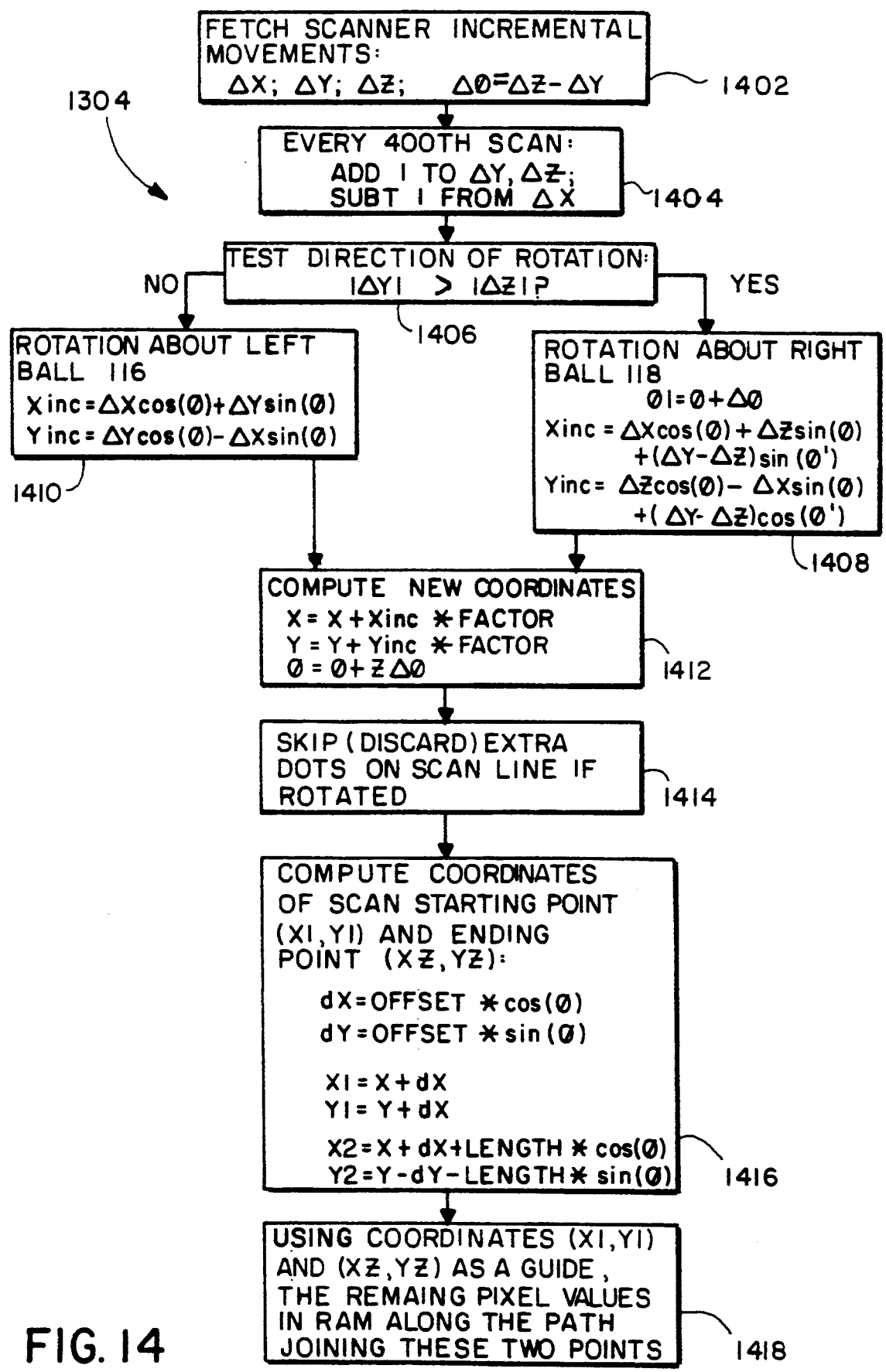
FIG. 14 forms a detailed flow diagram of the subroutine 1304 (FIG. 13) which maps the scanned data into an image.

FIG. 14 describes how the absolute position of the scan line in the RAM pixel image is computed. After the incremental motion values delta X, delta Y, and delta Z are retrieved and the incremental angular motion delta phi is computed (step 1402), a check is made at 1404 to see if this is the 400th scan. If so, then the incremental values are incremented by one to implement a gentle "spring" function, which is optional.

At 1406, delta Y is compared to delta Z to determine about which mouse ball the hand scanner is being rotated and to select which set of equations to use in computing the actual horizontal motion Xinc and vertical motion Yinc (note that delta X and delta Y are respectively parallel to and perpendicular to the main axis of the device 100 and, in general, are rotated by the angle phi from the true horizontal coordinates of the document and screen).

If delta Y exceeds delta Z, then the left mouse ball 116 has rolled further than the right mouse ball 118, and the device 100 is primarily rotating about the right mouse ball 118. Accordingly, the incremental horizontal and vertical motion Xinc and Yinc of the device is computed with respect to delta X and delta Z (the motion of the right mouse ball), and then this motion is corrected to give the motion of the left mouse ball, which is the reference coordinate (step 1408). The correction factor is computed as is shown in the figure, using the differential motion of the left end with respect to the right end (delta Y minus delta Z) multiplied by the sine and cosine of a special angle phi prime. Phi prime is the initial angle phi plus delta phi, which gives the median angle halfway between the initial angle phi and the final angle phi plus two delta phi.

If delta Z equals or exceeds delta Y, then the right mouse ball 118 has rolled further than the left mouse ball 116, and the device 100 is primarily rotating about the left mouse ball 116. In this case, the simpler formulas set forth at 1410 are used which compute Xinc and Yinc, the motion of the left mouse ball, as a function of its motion delta X and delta Y multiplied by the sine and cosing of phi, the initial angle from the horizontal, as shown in the figure.

Next, at 1412, the X and Y coordinates are computed by adding these incremented values (multiplied by an appropriate scaling factor) to the previous values of X and Y. (In one implementation, this scaling factor was 1.065989848.) The new angle phi is computed as the original angle plus two times the delta phi value, where two is also a scaling factor.

At step 1414, if the new position of the device 100 is angled with respect to the horizontal and vertical, then when the pixel values are placed into the rectangular array of pixel values in RAM, some of the pixel values will have to be discarded, since the angled scan will not extend past as many rows and columns as would a horizontal or vertical scan. Only one pixel value is required for each column intersected by the scan if the scan is more horizontal than vertical. Likewise, only one pixel for each row intersected by the scan if the scan is more vertical than horizontal. Accordingly, one out of every so many pixels is discarded to reduce the number of pixels to equal the number of columns or rows intersected, which corresponds to the number of pixel values that will be recorded in the rectangular array.

Finally, the beginning and end coordinates of the scanned image with respect to the X and Y values, extending out at the angle phi, are computed (step 1416). Then these coordinates are used to determine where the remaining (non-discarded) pixels are written into the RAM rectangular array of pixel values (step 1418).

When an image is scanned that has a width wider than the maximum scannable column width, the device 100 is carefully scanned in lawn mower fashion down one column, up the next, down the next, and so on with the scanned columns overlapping, as is illustrated in FIG. 15. In FIG. 15, a large image 140 is scanned first in the downward direction as shown at A and then in the upward direction as shown at B, with the device 100 kept substantially parallel to the bottom-edge of the document 110. The scans A and B partially overlap as is illustrated in FIG. 20, where the scan A is shown at 2002 and the scan B is shown at 2004.

Due to cumulative tracking errors, and with reference to FIGS. 16 to 19, an object 1602 is partially reproduced at 1702 in the downwards A scan and is partially reproduced at 1802 in the upwards B scan. The coordinates of these partial reproductions 1702 and 1802 do not overlap precisely as they should (FIG. 19). There has been some tracking error drift in both the x and y directions. This error must be corrected before the scan B 2004 is combined in the same RAM memory buffer with the scan A 2002. The region of overlap 2006 is therefore examined to detect and correct the cumulative tracing error. More particularly, small regions such as the regions 2008 and 2010, spaced 50 scan lines or so apart, are tested to determine the relative cumulative positioning error between the two scans, and the data in the scan B are then corrected before the data from the scans A and B are combined.

Figure 21:
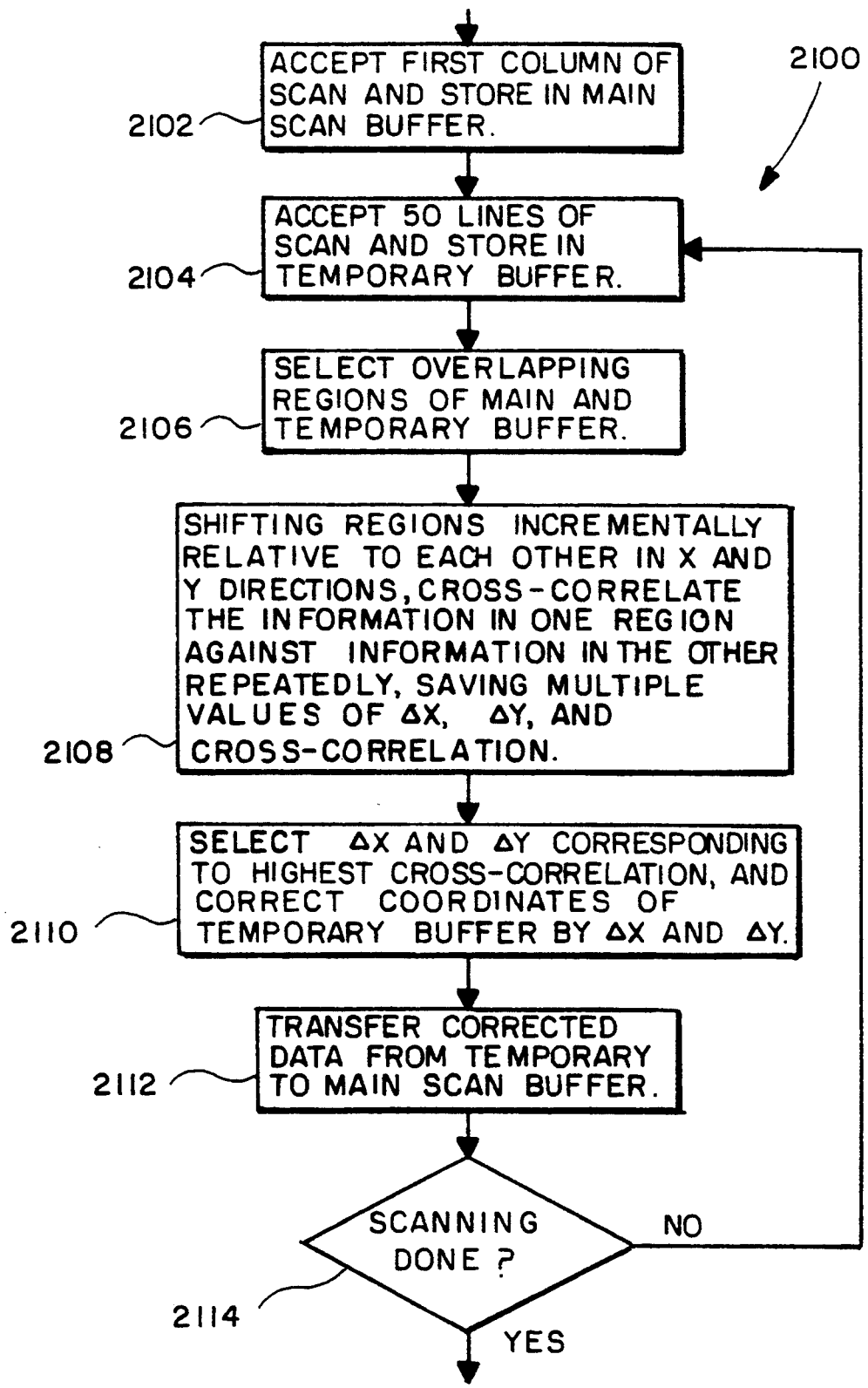
FIG. 21 is a flow chart of the program that detects and corrects scan alignment errors in adjacent columns.

A suitable correction subroutine 2100 is illustrated in FIG. 21.

At 2102, the first scan A in the downwards direction is completed and is stored in a main scan buffer, as has been explained.

Next, a repetitive process is commenced which encompasses the steps 2104 through 2114. During each repetition, 50 scanning lines are accepted (in the second scan B in the upwards direction, and in subsequent overlapping scans), analyzed to determine the positioning error, corrected and stored in the main scan buffer.

At 2104, 50 lines are scanned (at the bottom of the B scan initially) and are saved in a temporary buffer. Next, at 2106, an overlapping region (such as the region 2010 in FIG. 20) is selected from both the A and B scan data.

At 2108, the A region 2010 and B region 2010 data values are repeatedly cross-correlated against each other, with incrementally displaced relative values of x and y used each time. The cross-correlation is performed point-by-point over the entire region by multiplying corresponding scan values in region A and B together and then summing the products over the region. This gives a measure of the match of the two regions. As region B is incrementally shifted in the x and y directions with respect to region A, ultimately a relative positioning of the two regions is found where the images match up almost precisely, and this matching causes the cross correlation value to reach a maximum value which signals that the images are properly aligned.

As a simplified example of this process, the following program example, written in Basic, illustrates the mathematical steps.

DIM CROSCOR (-5, -5 TO +5, +5)

```
DIM CROSCOR (-5, -5 TO +5, +5)
    [this sets up a 10 by 10 array for the cross
    correlation values.]
LET XINIT =    [x COORDINATE OF REGION 2010
               LOWER LEFT HAND CORNER]
LET YINIT =    [y COORDINATE OF REGION 2010
               LOWER LEFT HAND CORNER]
    ["A" is a two-dimensional array containing
    the scan values for the column A]
    ['B' is a two-dimensional array containing
    the scan values for the column B]
FOR X = -5 TO +5 REPEAT
    FOR Y = -5 TO +5 REPEAT
    LET CROSCOR(X,Y) = 0
    NEXT Y
NEXT X
    [2 cro the array CROSCOR]
LET MAXC = 0
LET MAXCX = 0
LET MAXCY = 0
    [Zero buffers for the maximum cross correlation
    value and its delta x and delta y coordinates.]
    [Repeat for incrementally displaced x and y
    values.]
FOR DELX = -5 TO +5 REPEAT
    FOR DELY = -5 TO +5 REPEAT
    [Cross correlate over a 20 by 20 pixel
    region]
    FOR X = XINIT TO XINIT + 20 REPEAT
        FOR Y = YINIT TO YINIT + 20 REPEAT
        [Sum up the products of the
        corresponding pixels]
            LET CORSCOR (DELX, DELY) =
            CROSCOR (DELX, DELY) +
            A(X,Y) * B(X + DELX, Y + DELY)
        NEXT Y
    NEXT X
    [Test for maximum and save coordinates
    of maximum]
    IF MAXC > CROSCOR (DELX, DELY) THEN
        LET MAXC = CROSCOR (DELX, DELY)
        LET MAXCX = DELX
        LET MAXCY = DELY
    END IF
    NEXT DELY
NEXT DELX
```

Upon completion of the above simplified program, the mispositioning delta x value is MAXCX and the mispositioning delta y value is MAXCY. When the region B pixel data values are mapped into the main scan buffer, their x and y positions are corrected by this amount.

In this manner, a seamless image is obtained even though the external image was scanned in multiple segments. Naturally, the size of the regions compared, the spacing between compared regions, and the number of incremental values in the x and y direction that are utilized may be varied from those used in this example to reflect the specialized needs of any given scanner.

In some instances, the compared regions may not contain enough detail and variance to give rise to a proper single-peaked maximum to the cross-correlation value. In other instances, patterns in the image may produce multiple peaks of equal (or almost equal) values. These special cases should be detected by the program and then different regions of comparison should be selected. And if no proper regions can be found, then dead reckoning may be utilized as described above until a meaningful cross-correlation set of values is obtained. In many instances when the cross-correlation values are not single peaked positioning may not be critical, or it may only be necessary to match up a pattern, and cyclic shift may not be of great concern.

By way of example, the following computer program illustrates one way in which a computer program similar to that illustrated in the figures can be implemented:

```
/*------------------------------------------------------------
Scan data

DMA_function :   0 ==> Config DMA & INT
                 1 ==> Read data
                 2 ==> Restore DMA & INT
                 3 ==> Skip dots -------------------------------------------------------------*/
define pi 3.141592654
#define CirFactor 0.0003795246454     /* 0.0003795246454 radian per count*/
#define CirCount 4139                 /* count for 1/4 rotate cycle */
#define factor 1.065989848            /* 1.065989848 */
#define Offset 249.375                /* 210 * 2.375 = 498.75*/
#define SpringFactor 400
define TableScale 1000000 define UpArrow 72
define DownArrow 80
#define LeftArrow 75
#define RightArrow 77
#define Keyp 43
#define Keym 45
define KeyESC 27 include <graphics.h>
include <alloc.h>
#include <dos.h>
#include <math.h>
#include <scan.h>
#include <sys/stat.h>
#include <fcntl.h>
include <menu.h> int GraphDriver = DETECT , GraphMode;
int MinX=0, MinY=0, MaxX=559, MaxY=399, MaxColors=16;
double AspectRatio;                   /* information of the      */
struct palettetype CurPalette;        /* current display device  */
int Mouse;
/* mouse information       */
int ImageMinX=0, ImageMinY=0;
int ImageMaxX=559, ImageMaxY=399;     /* image area              */
int CurColor = WHITE;                 /* current color           */
int RealWhite = WHITE;
int RealBlack = BLACK;
int CurTools = PENCIL;                /* current tools used      */
int LastTools = PENCIL;
int ButtonStatus;                     /* current button status   */
int CursorX, CursorY;                 /* current cursor position */
int DrawValid = FALSE;                /* draw is valid           */
int ChoiceValid = FALSE;
int LeftPressed = FALSE;              /* is left button pressed ? */
int RightPressed = FALSE;             /* is right button pressed ?*/
int FirstCurX, FirstCurY;             /* first corner of rectangle*/
int RectH = -9;                       /* default rectangle size   */
int CurMinX, CurMinY, CurMaxX, CurMaxY;
int CurFillPattern = SOLID_FILL;      /* default fill pattern     */
int CurFillColor = WHITE;             /* default fill colour      */
int CurLineStyle = SOLID_LINE;        /* default line style       */
int CurLineThick = NORM_WIDTH;        /* default line width       */
int OBaseX, OBaseY;                   /* base of option area      */
int IIBaseX, IIBaseY;
```

```c
int I2BaseX, I2BaseY;                       /* base of icon area         */
int CP1BaseX, CP1BaseY;
int CP2BaseX, CP2BaseY;                     /* base of color/patt. area */
int CurTextStyle = SMALL_FONT;              /* default text style        */
int CurCharMult = 9;                        /* default char points size */
int CurCharDiv = 8;                         /* default char height       */
int BrushShape[20];
int CurBrushShape = 0;
int ImageUndo = FALSE;
char FileName[9] = "";
int CurEditMode = E_COPY;                   /* default edit mode         */
int SavePicture = FALSE;                    /* save current pic. flag    */
int PreSavePic = FALSE;
int X_Flag = FALSE;

int Button_status=0;
int X_count=0;
int Y_count=0;
int Z_count=0;
int AngleYZ=0;
unsigned Store_pointer=0;
unsigned Pick_pointer=0;
int X_total=0;
int Y_total=0;
long SinArray[CirCount+1];
long CosArray[CirCount+1];
int Exit=-1;

main()
{
        int Spring=0;
        int SinHandle;
        int CosHandle;
        int X_temp,Y_temp,Z_temp;
        int X1,Y1,X2,Y2;
        int xp1,yp1,xp2,yp2;
        long dx,dy;
        int dangle=0;
        int totalangle=0;
        int delta=0;
        int Index1=0;
        int Index2=0;
        long newx_count,newy_count;
        long x1,y1;
        int n=15;
        int length;
        int Interval=-1;
        long Sinangle=0;
        long Cosangle=1;
        long SinangleD=0;
        long CosangleD=1;
        void *DMAPtr,*DRAWPtr,*GREYPtr,*SKIPPtr,*TIFFPtr0,*TIFFPtr1,*BIGPtr;
        unsigned Size;

SinHandle = open( "SinTable.dat", O_BINARY,S_IREAD );
        read( SinHandle , SinArray , (CirCount+1)*4 );
        CosHandle = open( "CosTable.dat", O_BINARY,S_IREAD );
        read( CosHandle , CosArray , (CirCount+1)*4 );
        close( SinHandle );
        close( CosHandle );

_RegisterDrivers();
        initgraph( &GraphDriver , &GraphMode , "" );
        _MouseReset();
        _MouseCursorOff();

Size = 512;
        if( ( DMAPtr  = malloc( Size ) )  == NULL ) _MALLOCError();
        if( ( DRAWPtr = malloc( Size ) )  == NULL ) _MALLOCError();
        if( ( GREYPtr = malloc( Size ) )  == NULL ) _MALLOCError();
        if( ( SKIPPtr = malloc( Size ) )  == NULL ) _MALLOCError();
        if( ( TIFFPtr0 = malloc( 65535 ) ) == NULL ) _MALLOCError();
        if( ( TIFFPtr1 = malloc( 65535 ) ) == NULL ) _MALLOCError();
        if( ( BIGPtr   = malloc( 65535 ) ) == NULL ) _MALLOCError();
```

```
        DMA_function( DMAPtr , DRAWPtr , GREYPtr , SKIPPtr , TIFFPtr0 ,
        TIFFPtr1 , BIGPtr , Interval , 0 );

x1=-200 * TableScale;
        y1=20 * TableScale;
        xp1=0;
        yp1=0;
        xp2=0;
        yp2=0;
        X1=0;
        Y1=0;
        X2=207;
        Y2=405;
        dangle=0;
        totalangle=0;
        length=X2-X1;

while ( kbhit() == 0 ) {
        DMA_function( DMAPtr , DRAWPtr , GREYPtr , SKIPPtr , TIFFPtr0 ,
        TIFFPtr1 , BIGPtr , Interval , 1 );
        X_temp=Y_count;
        Y_count=Z_count;
        Z_count=X_temp;

Spring++;
        if( Spring >= SpringFactor ) {
                Y_count++;
                Z_count++;
                X_count--;
                Spring = 0;
        } delta=AngleYZ;
        totalangle = dangle + delta;
        Index2 = abs(totalangle);
        if( Index2 >= CirCount ) Index2 = CirCount;
        if( totalangle<0 ) {
                SinangleD=SinArray[Index2] * -1;
        } else {
                SinangleD=SinArray[Index2];
        }
        CosangleD=CosArray[Index2];

if( abs(Y_count) > abs(Z_count) ) {
newx_count = X_count*Cosangle + Z_count*Sinangle + (Y_count-Z_count)*SinangleD
newy_count = Z_count*Cosangle - X_count*Sinangle + (Y_count-Z_count)*CosangleD
} else {
newx_count = X_count*Cosangle + Y_count*Sinangle;
newy_count = Y_count*Cosangle - X_count*Sinangle;
} x1=x1+newx_count * factor;
        y1=y1+newy_count * factor;

dangle=dangle+delta*2;

Index1 = abs(dangle);
        if( Index1 >= CirCount ) Index1 = CirCount;
                if( dangle<0 ) {
                        Sinangle=SinArray[Index1] * -1;
                }else {
                        Sinangle=SinArray[Index1];
                }
        Cosangle=CosArray[Index1];

dx=Offset * Cosangle;
        dy=Offset * Sinangle;
        xp1=( x1+dx ) / TableScale;
        yp1=( y1-dy ) / TableScale;

xp2=( x1 + dx + length * Cosangle ) / TableScale;
        yp2=( y1 - dy - length * Sinangle ) / TableScale;

if( Cosangle == TableScale || Cosangle == 0 ) {
```

```
                    Interval = -1;
    } else {
            if ( Cosangle > 707107 ) {
                    Interval = TableScale/(TableScale-Cosangle);
            } else {
                    Interval = TableScale/(TableScale-Sinangle);
            }
    }
    DMA_function( DMAPtr , DRAWPtr , GREYPtr , SKIPPtr , TIFFPtr0 ,
    TIFFPtr1 , BIGPtr , Interval , 3 );
    if ( yp1 > Y1 && yp1 < Y2 && xp1 > 0 && xp1 < 432
       && yp2 > Y1 && yp2 < Y2 ) {
            Linetlf( xp1,yp1,xp2,yp2,GREYPtr,TIFFPtr0,TIFFPtr1 );
            Hline10( xp1,yp1;xp2,yp2,n,TIFFPtr0,TIFFPtr1,SKIPPtr );
    }
  } getch();
              DMA_function( DMAPtr , DRAWPtr , GREYPtr , SKIPPtr , TIFFPtr0 ,
              TIFFPtr1 , BIGPtr , Interval , 2 );
              closegraph();
              free( DMAPtr   );
              free( DRAWPtr  );
              free( GREYPtr  );
              free( SKIPPtr  );
              free( TIFFPtr0 );
              free( TIFFPtr1 );
              free( BIGPtr   );
              exit();
              getch();
              DMA_function( DMAPtr , DRAWPtr , GREYPtr , SKIPPtr , TIFFPtr0 ,
              TIFFPtr1 , BIGPtr , Interval , 2 );
              closegraph();
              free( DMAPtr   );
              free( DRAWPtr  );
              free( GREYPtr  );
              free( SKIPPtr  );
              free( TIFFPtr0 );
              free( TIFFPtr1 );
              free( BIGPtr   );
              exit();
    }
```

What is claimed is:

1. In a system for optically scanning the surface of an object and comprising an optical scanning device for repetitively generating representations of visually perceptible information of a portion of the object, each representation of visually perceptible information comprising a single row of pixel digits, and for each such representation of visually perceptible information for generating representations of movement of said scanning device over the object, said movement representations comprising a first X-direction movement representation, a first Y-direction movement representation, said Y-direction being normal to said X-direction and a representation of second Y-direction movement of a point on said scanning device separate from the point of said first Y-direction movement representation, a method comprising:

determining from said representation of first X-direction movement and said representation of first Y-direction movement a position value;

determining from said representation a first Y-direction movement and said representation of second Y-direction movement a rotation value indicative of scanning device rotation;

determining, from said position value and said rotation value, a storage location in a two-dimensional pixel array for a first of said pixel digits and a last of said pixel digits of the representation of visually perceptible information; and writing into said two-dimensional pixel array said plurality of pixel digits in an approximation of a straight line between the storage location of the first pixel digit and the storage location of the last pixel digit.

2. The method of claim 1 wherein each of said representations of movement identifies a change of position from the preceding such representation and said position value determining step comprises adding an amount determined from said representation of first X-direction movement to a priorly determined X-position value, and adding an amount determined from said representation of first Y-direction movement to a priorly determined Y-position value.

3. The method of claim 2 wherein said rotation value determining step comprises subtracting said representation of first Y-direction movement from said representation of second Y-direction movement, and adding an amount determined from the result of such subtraction to a priorly determined rotation value.

4. The method of claim 1 wherein each representation of visually perceptible information comprises a fixed number of digits and said writing step comprises:

reducing the number of digits in said representation of visually perceptible information in response to said rotation value; and writing the reduced number of pixels digits of said representation of visually perceptible information into said two-dimensional pixel array at locations determined from said position value and said rotation value.

5. A system for optically scanning the surface of an object bearing visually perceptible information, capturing the information, and representing it digitally as a two-dimensional pixel representation of an image, said system comprising:

a scanning device that can be positioned adjacent to the surface of an object to be scanned, said scanning device generating a signal output suitable for conveyance to a digital computer, said scanning device including an optical scanner that repeatedly scans an adjacent surface portion of such an object, capturing a representation of the visually perceptible information borne by that portion, and presenting the representation to the signal output, said scanning device being manually positionable over the surface of such an object to capture representations of visually perceptible information from plural adjoining and possible non-aligned and overlapping portions of such an object, and said scanning device including a mechanism that can interact with such an object to sense and to generate representations of surface translations and rotations of said device with respect to such an object and present these representations to the signal output;

a storage device comprising a plurality of storage locations each representing one pixel of a reproducible two-dimensional representation of a scanned object; and program means installable upon a computer and responsive to the representations of surface translation and rotation for writing representations of the visually perceptible information received by the computer from the scanning device into the storage device at ones of the plurality of storage locations determined from the representations of surface translation and rotation from said scanning device with respect to such an object to assemble a unitary image within the storage device from separately scanned image representations of adjoining and possible non-aligned and overlapping portions of an object as the scanning device is manually drawn across such an object in a relatively uncontrolled manner.

6. The system of claim 5 wherein said mechanism comprises a first sensing means having a fixed position on said device, for generating first representations of the surface translation of said first sensing means and a second sensing means having a second fixed position on said scanning device, separate from said first fixed position, for generating second representations of surface translation of said second sensing means and for presenting these representations to the signal output; and said program means being responsive to said first and said second representations of surface translation for writing said representations of visually perceptible information into said storage means.

7. The system of claim 6 wherein said optical scanner captures rectangular representations of the visually perceptible information, each rectangular representation having a length and a width, and said first and second fixed positions of said first and second surface translation sensing means are on a line parallel to the length of said rectangular representation.

8. The system of claim 5 wherein said mechanism comprises:

a first movement sensor for generating representations of movement in a first direction and for generating representations of movement in a second direction, normal to the first direction, and a second movement sensor spaced apart from said first movement sensor for generating representations of movement in a direction parallel to said first direction.

9. The system of claim 5 wherein said device comprises a source of equally spaced clock pulses and means responsive to said clock pulses for periodically presenting to the signal output a representation of the visually perceptible information and representations of translation and rotation generated in timed relationship to the transmitted representation of visually perceptible information.

10. The system of claim 5 wherein said optical scanner captures a first representation of visually perceptible information at a first position on said object and captures a second representation of visually perceptible information at a second position on said object, said second position being different from said first position;

said mechanism comprises means for generating representations of the translation and rotation differences between said first and second positions;

said device comprises means for presenting to the signal output, said first representation of visually perceptible information coupled with translation and rotation representations of said first position and for presenting to the signal output and said second representation of visually perceptible information coupled with the representations of the translation and rotation differences between said first and second positions; and said program means writes said first representation of visually perceptible information into said storage means at a location derived from the translation and rotation representations coupled with said first representation of visually perceptible information and writes said second representation of visually perceptible information into said storage means at locations derived from the translation and rotation differences between said first position and said second position.

11. The system of claim 10 wherein said second representation of visually perceptible information overlaps a portion of said first representation of visually perceptible information; and said program means is responsive to the translation and rotation differences between said first and second positions coupled with said second representation of visually perceptible information for replacing a portion of said first representation of visually perceptible information in said storage means with a portion of said second representation of perceptible information.

12. The system of claim 5 wherein the optical scanner comprises a charge coupled device means for capturing representations of visually perceptible information and for generating analog signals representative of the captured representations; and means for converting said analog signals into binary signals and for presenting said binary signals to the signal output.

13. The system of claim 12 wherein said means for converting comprises circuit means for converting said analog signals into binary grey scale code signals for presentation to the signal output.

14. The system of claim 12 wherein said device comprises means for illuminating said object; and
   said program means is operative to enable said illuminating means when in the optical scanning mode and to disable said illuminating means when in the mouse pointing mode.

15. The system of claim 5 wherein said mechanism comprises surface translation sensing means for generating first representations of movement of said device in a first direction relative to said device and for generating second representations of movement of said device in a second direction opposite to said first; and
   said program means being responsive to said first representations of movement and said second representations of movement for writing said representations of visually perceptible information into said storage means;
   whereby a unitary image can be assembled within the two-dimensional pixel representations from separately scanned image representations of adjoining and possibly nonaligned and overlapping portions of such an object as the device is manually drawn across such an object in both the first and the second directions.

16. The system of claim 5 comprising:
means for comparing representations of visually perceptible information received from said device with at least partially overlapping representations of visually perceptible information previously written into said storage device to identify errors in the translation and rotation representations of said received representations of visually perceptible information; and
   said writing means comprises means responsive to translation and rotation errors identified by the comparing means for writing said received representations of visually perceptible information into said storage device at positionally and rotationally corrected locations.

17. The system of claim 16 wherein said comparing means responds to the translation and rotation representations of received visual information representations for selecting portions of said visual information representations stored in said storage device for comparison with the received visual information representations.

18. The system of claim 17 comprising means for buffering said received visual information representations prior to comparison with visual information representation stored in said storage device.

19. The system of claim 18 wherein the storage device stores visual information representations of at least one region of the object and the buffering means stores visual information representations of the same one region; and
   said comparison means compares visual information representations of said one region stored in said storage device with positionally adjusted visual information representations of said one region stored in said buffering means.

20. The system of claim 16 wherein said writing means comprises means for writing said received representations into locations of said storage means occupied by said previously written visually perceptible information.

* * * * *